US011068478B2

United States Patent
Teplinsky et al.

(10) Patent No.: US 11,068,478 B2
(45) Date of Patent: *Jul. 20, 2021

(54) AUGMENTING RELIABILITY MODELS FOR MANUFACTURED PRODUCTS

(71) Applicant: OPTIMAL PLUS LTD., Holon (IL)

(72) Inventors: Shaul Teplinsky, San Francisco, CA (US); Bruce Alan Phillips, Har Nof Jerusalem (IL); Michael Schuldenfrei, Petach Tikwa (IL); Dan Sebban, Rishon LeZion (IL)

(73) Assignee: OPTIMAL PLUS LTD., Holon (IL)

( * ) Notice: Subject to any disclaimer, the term of this patent is extended or adjusted under 35 U.S.C. 154(b) by 258 days.

This patent is subject to a terminal disclaimer.

(21) Appl. No.: 15/460,061

(22) Filed: Mar. 15, 2017

(65) Prior Publication Data

US 2018/0267506 A1   Sep. 20, 2018

(51) Int. Cl.
*G06F 16/245* (2019.01)
*G06Q 10/00* (2012.01)
(Continued)

(52) U.S. Cl.
CPC ..... *G06F 16/245* (2019.01); *G05B 19/41875* (2013.01); *G06Q 10/067* (2013.01);
(Continued)

(58) Field of Classification Search
CPC ............ G06F 16/245; G05B 19/41875; G05B 2219/31359; G06Q 10/067; G06Q 10/20; Y02P 80/114; Y02P 90/86
See application file for complete search history.

(56) References Cited

U.S. PATENT DOCUMENTS

| 879,885 A | 2/1908 | McClintock |
|---|---|---|
| 6,615,096 B1 | 9/2003 | Durrant et al. |

(Continued)

FOREIGN PATENT DOCUMENTS

| JP | 2007-122682 A | 5/2007 |
|---|---|---|
| WO | 2018/037347 A1 | 3/2018 |

OTHER PUBLICATIONS

Wang, Wendai, James Loman, and Pantelis Vassiliou. "Reliability importance of components in a complex system." In Annual Symposium Reliability and Maintainability, 2004—RAMS, pp. 6-11. IEEE, 2004. (Year: 2004).*

(Continued)

*Primary Examiner* — Chuen-Meei Gan
(74) *Attorney, Agent, or Firm* — Kilpatrick Townsend & Stockton LLP

(57) ABSTRACT

A method of augmenting a reliability model for a manufactured product includes receiving a product attribute identifying a product, receiving a first component attribute and a second component attribute, and receiving first manufacturing data and second manufacturing data, the first manufacturing data comprising manufacturing data associated with the first component and the second manufacturing data comprising manufacturing data associated with the second component. The method can include applying a set of compatibility rules to the first manufacturing data and the second manufacturing data, determining pairing data from the application of the set of compatibility rules to the first manufacturing data and the second manufacturing data, obtaining a reliability model of products including the product, augmenting the reliability model based on the pairing data, and performing one or more actions with the augmented reliability model.

14 Claims, 10 Drawing Sheets

(51) Int. Cl.
*G06Q 10/06* (2012.01)
*G05B 19/418* (2006.01)

(52) U.S. Cl.
CPC ... *G06Q 10/20* (2013.01); *G05B 2219/31359* (2013.01); *Y02P 80/10* (2015.11); *Y02P 90/80* (2015.11)

(56) References Cited

U.S. PATENT DOCUMENTS

| | | | |
|---|---|---|---|
| 7,079,965 B2 | 7/2006 | Burghaus et al. | |
| 8,059,573 B2* | 11/2011 | Julian | H04W 4/21 370/312 |
| 8,078,489 B1* | 12/2011 | Marsten | G06Q 10/04 705/7.25 |
| 8,711,161 B1* | 4/2014 | Scotzniovsky | G01R 31/318544 345/531 |
| 8,798,852 B1* | 8/2014 | Chen | G06F 21/44 701/29.6 |
| 9,823,937 B1* | 11/2017 | Hayward | G06F 9/44505 |
| 2004/0039561 A1* | 2/2004 | Montano | G06F 9/4411 703/22 |
| 2004/0117140 A1* | 6/2004 | Borg | G03G 15/55 702/85 |
| 2005/0187649 A1 | 8/2005 | Funk et al. | |
| 2005/0278666 A1 | 12/2005 | Diamond | |
| 2009/0034591 A1* | 2/2009 | Julian | H04W 4/21 375/220 |
| 2009/0070771 A1 | 3/2009 | Yuyitung et al. | |
| 2010/0240317 A1* | 9/2010 | Giles | H04B 17/309 455/67.13 |
| 2012/0054493 A1* | 3/2012 | Bradley | H04W 8/005 713/171 |
| 2013/0060801 A1* | 3/2013 | Beaver, III | G06T 19/00 707/758 |
| 2014/0019304 A1* | 1/2014 | Lee | G06Q 10/00 705/26.81 |
| 2014/0380261 A1* | 12/2014 | Bickford | G06F 17/5009 716/136 |
| 2015/0346705 A1* | 12/2015 | Chew | G05B 19/0426 700/86 |
| 2015/0382388 A1 | 12/2015 | Legallais et al. | |
| 2016/0006257 A1 | 1/2016 | Walley et al. | |
| 2016/0125733 A1 | 5/2016 | Sallas et al. | |
| 2016/0192407 A1 | 6/2016 | Fyfe et al. | |
| 2016/0321594 A1* | 11/2016 | Linde | G06Q 10/06395 |
| 2018/0053104 A1 | 2/2018 | Teplinsky et al. | |
| 2018/0348291 A1* | 12/2018 | Teplinsky | G01R 31/2601 |

OTHER PUBLICATIONS

Hicks, B. J., and S. J. Culley. "Compatibility issues for mechanical system modelling with standard components." Proceedings of the Institution of Mechanical Engineers, Part B: Journal of Engineering Manufacture 216, No. 2 (2002): 235-249. (Year: 2002).*
weibull.COM Issue 66, Aug. 2006 "Reliability Importance Measures of Components in a Complex System—Identifying the 20% in the 8%0 Rule" https://www.weibull.com/hotwire/issue66/relbasics66.htm (Year: 2006).*
U.S. Appl. No. 15/243,661 Non-Final Office Action dated May 13, 2019, 35 pages.
International Search Report and Written Opinion for Application No. PCT/IB2017/055068 dated Dec. 11, 2017, 11 pages.
U.S. Appl. No. 15/243,661 Final Office Action dated Sep. 13, 2019, 40 pages.
U.S. Appl. No. 15/243,661, Final Office Action dated Jun. 24, 2020, 47 pages.
Singhal et al., "Supply Chains and Compatibility Among Components in Product Design", Journal of Operations Management, vol. 20, No. 3, Mar. 4, 2002, pp. 289-302.

* cited by examiner

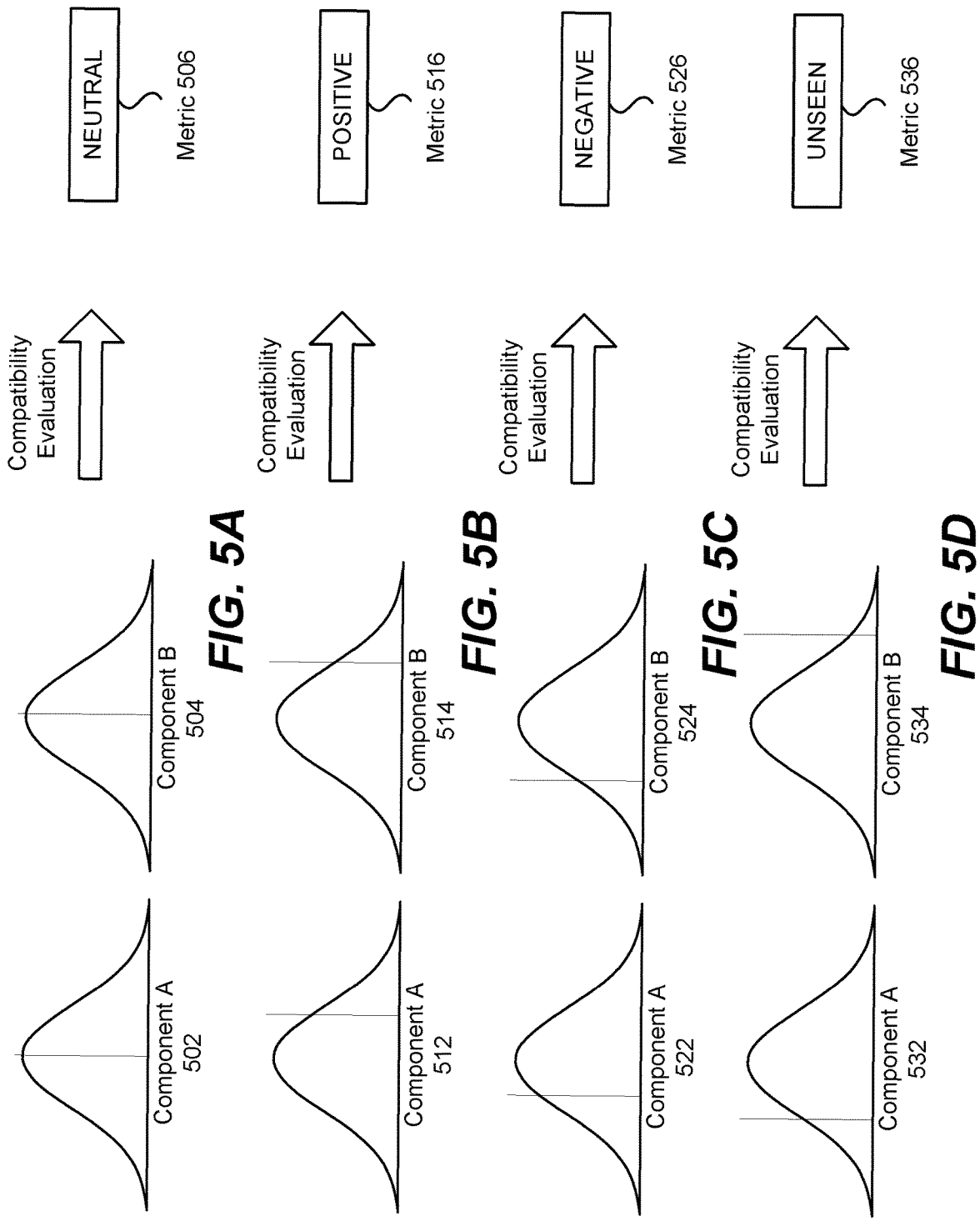

AUGMENTING RELIABILITY MODELS FOR MANUFACTURED PRODUCTS

BACKGROUND OF THE INVENTION

Products manufactured and sold around the world today are often composed of many individual components that, when assembled together, form a structure or device that can perform various functions. Many modern products that include electronic devices, such as smart phones, smart watches, computers, tablets, notebooks, automobiles, airplanes, and any other similar products, and modern products that may not include electronic devices, such as suspension systems, engines, construction tools, and the like, may each be formed of hundreds or even thousands of individual components. Furthermore, it is not uncommon for the individual components that make up the product to be products themselves, each having tens or even hundreds of its own assembled individual components. These components play a significant role in the quality and useful life of the product. One defective pairing of the components could render the entire product useless or substantially reduce its useful life.

The useful life of a product is often referred to as a product's "lifetime." To maximize the lifetime of a product, manufacturers attempt to predict an accurate reliability model for the product, and then use the predicted reliability model to design an accurate maintenance plan that effectively decreases, minimizes, or otherwise maintains the rate of degradation of the product. Such maintenance plans may be designed from reliability models based on manufacturing specifications and engineering expertise/knowledge of the product manufactured. A simple example is a car manufacturer's suggested maintenance plan to change a car's motor oil every 15,000 miles. Through research and analysis of the car's design, the manufacturer determines that for the entire population of cars of a specific model can operate 15,000 miles before needing an oil change. In some examples, a car manufacturer may dynamically update the maintenance plan for a given product based on in-field performance data obtained for that product. For instance, lengthening or shortening the 15,000 miles oil changing interval for a car in the population based on obtained in-field data about actual engine temperature or oil conductivity of that car. Changing the motor oil according to the manufacturer's suggested maintenance plan helps ensure that the car is operable for an expected lifetime. Another example is an electronic device formed of one or more electronic components, such as a processor, memory, battery, cooling fan, electromagnetic shielding, and the like. In such products, one or more components may degrade at a predetermined rate and thus may need replacement at a specified interval of time according to a reliability model for those components. Despite the progress made in the field of product manufacturing technology however, there is a need in the art for improved methods and systems related to providing accurate unit-specific reliability models.

SUMMARY OF THE INVENTION

Embodiments of the present invention provide a method, as well as an apparatus and a system configured to perform a method of augmenting reliability models with manufacturing data. The method uses manufacturing data associated with each component in a product to fine tune a reliability model for each product. The reliability model can then be used to determine a lifetime of each product and to generate a maintenance plan unique to each product, thereby providing a customized, accurate maintenance plan for each individual product.

In some embodiments, a method of augmenting a reliability model for a manufactured product includes: receiving a product attribute identifying a product; receiving a first component attribute and a second component attribute, the first component attribute identifying a first component included in the product and the second component attribute identifying a second component included in the product; receiving first manufacturing data and second manufacturing data, the first manufacturing data comprising manufacturing data associated with the first component and the second manufacturing data comprising manufacturing data associated with the second component; applying a set of compatibility rules to the first manufacturing data and the second manufacturing data; determining pairing data from the application of the set of compatibility rules to the first manufacturing data and the second manufacturing data; obtaining a reliability model of products including the product; augmenting the reliability model based on the pairing data; and performing one or more actions with the augmented reliability model.

The pairing data can include data indicating a measure of compatibility between the first and second components. The pairing data can be determined based at least in part on a relationship between product reliability and the measure of compatibility between the first and second components. In some embodiments, a type of the first manufacturing data and a type of the second manufacturing data can be defined by a compatibility model, where the compatibility model includes a set of compatibility rules that is configured to determine the pairing data from the set of compatibility rules. The method can further include analyzing a multi-dimensional model to reduce the dimensionality of the data when the product includes more than the first component and the second component, or when at least one of the first component and the second component of the product includes more than one type of manufacturing data. The pairing data can indicate that the pairing of the first and second components is an unseen pairing. Performing one or more actions with the augmented reliability model can include augmenting a maintenance plan for the product. Performing one or more actions with the augmented reliability model can include determining a remaining useful lifetime of the product based on the augmented reliability model. Performing one or more actions with the augmented reliability model can include customizing a data collection method for the product. Performing one or more actions with the augmented reliability model can include customizing a data collection method for the products including the product. The reliability model can be for a general population of products that includes the product. The reliability model can be a modified reliability model for the product. In certain embodiments, obtaining the reliability model includes querying a manufacturing information database and receiving the reliability model. The product can be in use by an end user. The first and second component attributes and the first and second manufacturing data can be received by a compatibility module containing a compatibility model.

In some embodiments, a computer product comprising a non-transitory computer readable medium storing a plurality of instructions that when executed control a device including one or more processors, the instructions comprising: receiving a product attribute identifying a product; receiving a first component attribute and a second component attribute, the first component attribute identifying a first component included in the product and the second component attribute identifying a second component included in the product; receiving first manufacturing data and second manufacturing data, the first manufacturing data comprising manufacturing data associated with the first component and the second manufacturing data comprising manufacturing data associated with the second component; applying a set of compatibility rules to the first manufacturing data and the second manufacturing data; determining pairing data from the application of the set of compatibility rules to the first manufacturing data and the second manufacturing data; obtaining a reliability model of products including the product; augmenting the reliability model based on the pairing data; and performing one or more actions with the augmented reliability model.

The pairing data can include data indicating a measure of compatibility between the first and second components. The pairing data can be determined based at least in part on a relationship between product reliability and the measure of compatibility between the first and second components.

In some embodiments, a device includes: memory configured to store lines of code; and one or more processors coupled to the memory, the one or more processors configured to: receive a product attribute identifying a product; receive a first component attribute and a second component attribute, the first component attribute identifying a first component included in the product and the second component attribute identifying a second component included in the product; receive first manufacturing data and second manufacturing data, the first manufacturing data comprises manufacturing data associated with the first component and the second manufacturing data comprises manufacturing data associated with the second component; apply a set of compatibility rules to the first manufacturing data and the second manufacturing data; determine pairing data from the application of the set of compatibility rules to the first manufacturing data and the second manufacturing data; obtain a reliability model of products including the product; augment the reliability model based on the pairing data; and perform one or more actions with the augmented reliability model.

The memory can include a traceability module, compatibility module, and a pairing module.

A better understanding of the nature and advantages of embodiments of the present invention may be gained with reference to the following detailed description and the accompanying drawings.

BRIEF DESCRIPTION OF THE DRAWINGS

FIGS. 5A-5E illustrate in graphical views examples of an operation of a compatibility model, according to embodiments of the present invention

DETAILED DESCRIPTION OF SPECIFIC EMBODIMENTS

Figure 1:
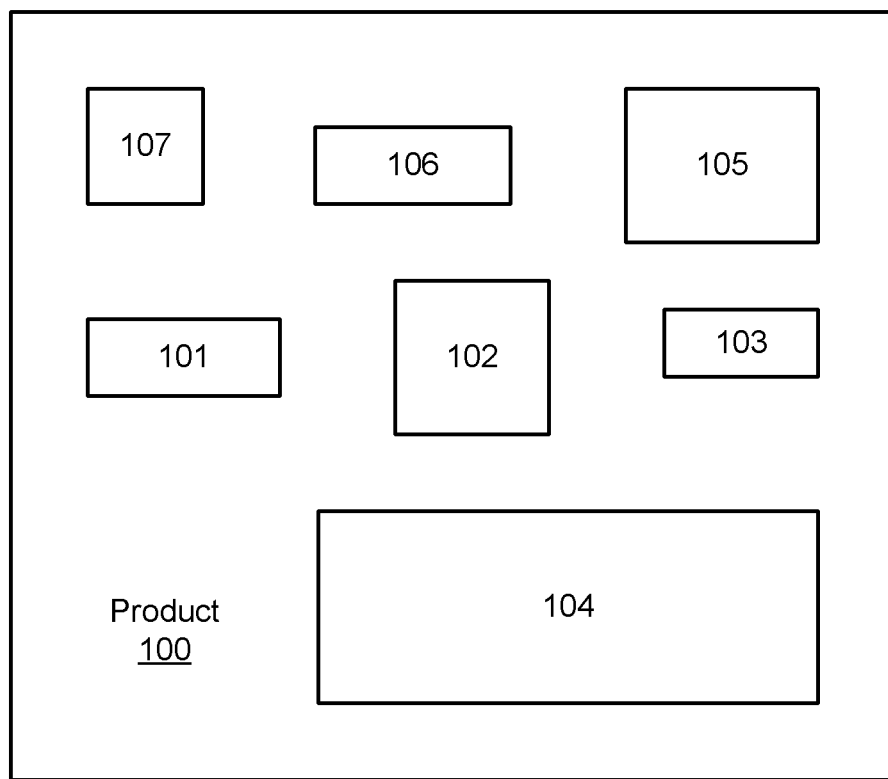
FIG. 1 is a plan view of a block diagram illustrating an exemplary product.

An embodiment of the present invention provides a method of augmenting reliability models with smart pairing data for enabling accurate determination of a product's lifetime and for enabling the creation of a customized, more accurate unit-specific maintenance plan for manufactured products. These customized plans are accurately tailored to the nuances of a manufactured product so that a product is not being over-maintained according to a general maintenance plan, which can cause an end user to pay more than he or she needs to in maintenance costs, or under-maintained according to the general maintenance plan, which can lead to premature failure of the product. Furthermore, augmented reliability models allow a manufacturer to more accurately determine the usable lifetime of each, individual manufactured product. The method may include acquiring smart pairing data by dynamically adapting test sequences during testing of a product containing various components, e.g., adaptive testing, adaptive manufacturing, and adaptive provisioning, as will be discussed further herein. In embodiments, the smart pairing data may be acquired by receiving manufacturing data for each component, applying a set of compatibility rules to the manufacturing data for each component to determine pairing data, applying a set of pairing rules to the pairing data to determine one or more actions to be performed for minimizing a probability of failure of the product under all operating conditions or failure of the product during testing at next stages of manufacturing. According to some embodiments of the present disclosure, the smart pairing data may be used to augment a reliability model to more accurately determine a lifetime of a product and/or customize a maintenance plan.

In order to reduce or minimize the occurrence of incorporating defective components in the product, various test sequences have been implemented in the manufacturing process to filter out defective, or potentially defective, components that are unfit for use in the product. An example of such test sequences includes sort testing where newly manufactured components are subjected to various test sequences. Components that do not perform to a desired specification may fail its current test sequence and be separated into a bin according to its failure condition. For instance, if a processor has a low operating frequency, the processor may fail a test sequence testing its operating speed and be binned accordingly. In another instance, if a memory chip has a low operating frequency, the memory chip may fail a test sequence testing its operating speed and be binned accordingly. Components that fail test sequences may be removed from the manufacturing process to avoid being incorporated in the product. Components that pass the tests, however, may advance to the next stage of manufacturing.

Components that have passed all the tests may be incorporated into the product and subsequently sold to a customer. For example, a processor and memory chip that both operate at a sufficient frequency may be incorporated into an electronic device, such as a tablet. In theory, because the components conform to specification and have passed all of the test sequences, the product will successfully operate in the field, e.g., when used by an end-user. However, in reality, some of these products may still fail or underperform.

One reason why these products still fail or underperform is that even though the components implemented in the product conform to specification, the combination of the components result in a high probability of failure or underperformance. For instance, if a processor that is within specification but operates at a relatively high frequency is combined with a memory chip that is within specification but operates at a relatively low frequency, the memory chip may not be able to support the processor under all operating conditions, especially when the processor is operating at a frequency higher than an operating limit of the memory chip, where the operating limit is within specification. This results in underperformance of the processor, or even failure of the product.

Typically, manufacturers are unaware of such underperforming products. Thus, a manufacturer may design a maintenance plan based on a general reliability model of a population of a specific product as a whole and apply this generic maintenance plan to all of those products, including the underperforming products. As a result, the underperforming products will prematurely fail because the general maintenance plan will be insufficient to maintain the underperforming product. Additionally, because manufacturers are unaware of these underperforming products, manufacturers may overestimate the lifetime of the product. Accordingly, improvements to determining an accurate reliability model for manufactured products are desired.

Embodiments describe a method of augmenting a reliability model for a manufactured product based on smart pairing data. The augmented reliability model can then be used to more accurately determine a lifetime of a product and/or customize a maintenance plan that is tailored to the specific product. Smart pairing data may be data gathered during performance of a smart pairing method, which can be a method for manufacturing high quality products that perform well under all operating conditions. The smart pairing method may dynamically adapt test sequences during testing of a product containing various components. In embodiments, the method may be performed by receiving manufacturing data for at least two components, applying a set of compatibility rules to the manufacturing data for each component to determine pairing data, applying a set of pairing rules to the pairing data to determine one or more actions to be performed for reducing a probability of failure of the product under operating conditions. The pairing data can be used to augment a reliability model so that is more accurate at predicting the lifetime of a product. This augmented reliability model can also be used to generate a maintenance plan that is customized to the unique performance and characteristics of an individual product. In order to understand the benefits of smart pairing and augmenting reliability models, it may be useful to discuss details of a manufactured product and a smart pairing method.

I. Manufactured Product

FIG. 1 is a simplified block diagram illustrating an exemplary product 100 that can be formed using smart pairing methods, according to embodiments of the present invention. Product 100 may be any product that is formed of two or more individual components, such as, but not limited to, a semiconductor device, video card, motherboard, touchscreen display, smart phone, smart watch, computer, tablet, notebook, automobile, airplane, suspension systems, engines, and construction tools. In some embodiments, product 100 is a multiple chip package (MCP) that includes a plurality of individual semiconductor devices, i.e., chips, such as application specific integrated circuits (ASIC), processors, field programmable logic arrays (FPGA), and the like. The MCP may be formed of the same chips manufactured from the same manufacturer, different chips manufactured from the same manufacturer, and/or different chips manufactured from different manufacturers. Each of these products may be formed of a plurality of components that, when assembled together, form a structure or device that can perform various functions.

As shown in FIG. 1, product 100 may be formed of components 101-107. Each component may play a role in the operation of product 100. In an example where product 100 is a motherboard, component 101 may be a processor and component 102 may be a memory device that interact with one another during operation of product 100. Component 103 may be a video card, component 104 may be a network card, component 105 may be a sound card, component 106 may be a power supply, and component 107 may be a hard drive. Components 101-107 may interact with one another to enable the motherboard (i.e., product 100) to perform various functions, such as display pictures and videos, operate in a network, output sound, and store information. Although FIG. 1 illustrates only seven components 101-107, embodiments are not limited to such configurations. Other embodiments may have more or less than seven components. For instance, some products may have only two components, and some other products may have ten components.

It is to be appreciated that the words "product" and "component" may be interchanged depending on a perspective from which a product is viewed. As an example, product 100 (e.g., a motherboard) may be a component for another product (e.g., a notebook computer). The notebook computer may include several other components in addition to product 100 (e.g., a motherboard), such as a keyboard, track pad, touch-screen display, battery, and the like. Thus, even though product 100 may be interpreted as a "product", product 100 may also be interpreted as a component when viewed from a broader perspective. In another example, each component of product 100 may itself be a product composed of two or more individual components. For instance, component 101 (e.g., a processor) may be formed of a power supply, memory, and a logic chip. Thus, even though component 101 may be interpreted as a "component", component 101 may also be interpreted as a product when viewed from a narrower perspective.

Assembly of product 100 may be performed by randomly assembling components 101-107 together, meaning that across all manufactured units of product 100, there is no correlation between components 101-107. Each component may be sourced from a supplier who manufactures the component. Additionally, each component received from the supplier may conform to a set of specification dictated by a purchaser of the components.

By randomly assembling components 101-107, there may be some situations where two components result in an inferior combination even though each component meets its own set of specifications. As an example, if component 101 is within specification but is relatively fast and component 102 is within specification but relatively slow, the limitations of component 102 may limit the capabilities of component 101, preventing component 101 from being used to its full potential and resulting in a product 100 having below-average performance characteristics. Additionally, there may be some situations where two components result in a superior combination. For instance, if component 101 and component 102 are within specification but are both relatively fast, then product 100 may perform better than the average product, thereby resulting product 100 having above-average performance characteristics. Thus, it may be useful to know the performance characteristics of product 100 during manufacturing so that the manufacturing process can adapt to the given relationship between the assembled components, instead of adapting the manufacturing process to the characteristics of each individual component as is often done.

II. Model Augmenting System

According to embodiments herein, a model augmenting system may be implemented in the manufacturing process. The model augmenting system may be configured to perform a smart pairing method to determine the performance characteristics of product 100, use this determination to augment a reliability model for product 100, and then use the augmented reliability model to accurately determine a useful lifetime of product 100 and/or customize a maintenance plan specific to product 100.

Figure 2:
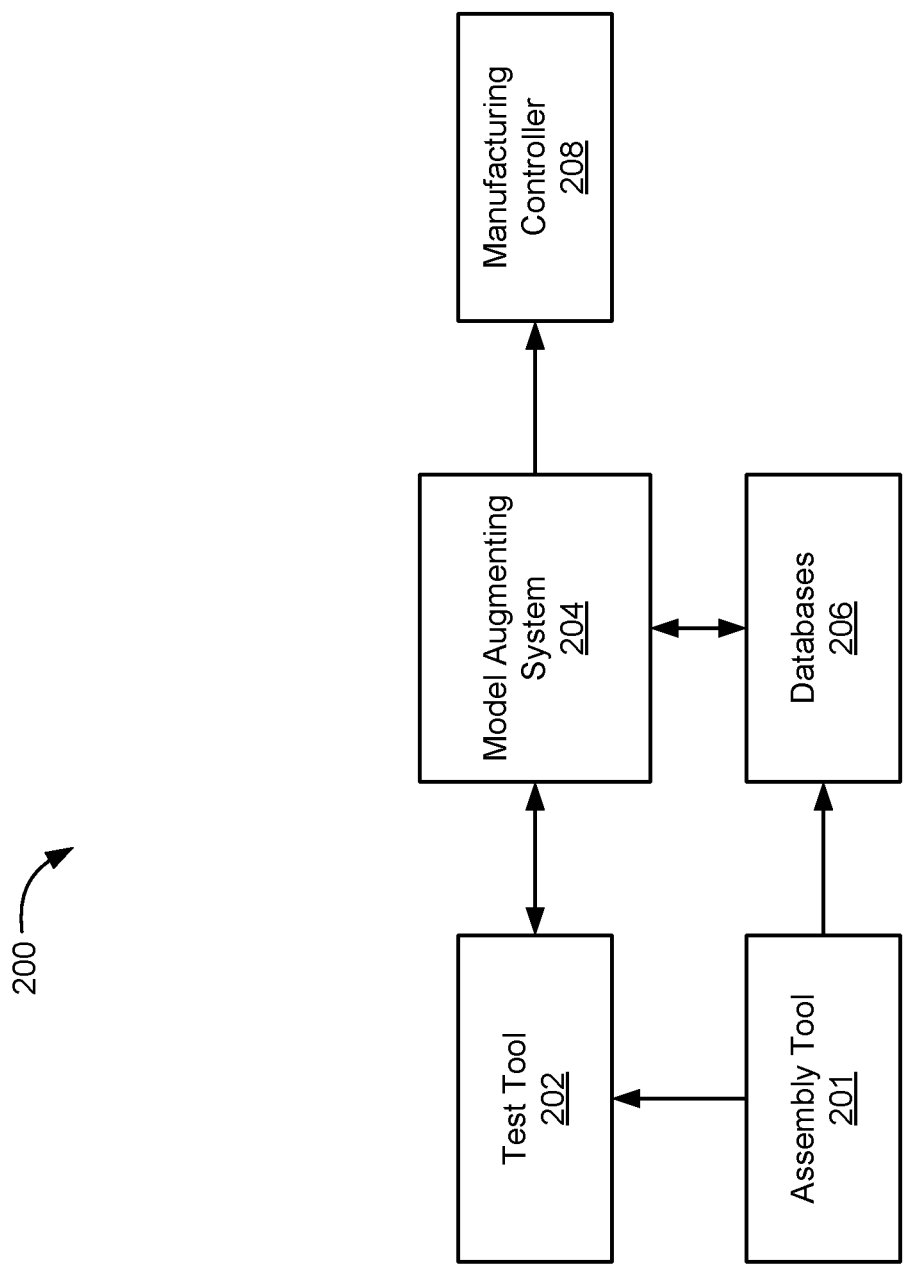
FIG. 2 is a plan view of a block diagram illustrating a smart pairing system, according to embodiments of the present invention.

FIG. 2 illustrates an exemplary environment 200 for augmenting a reliability model according to embodiments of the present invention. In embodiments, environment 200 may include an assembly tool 201 for manufacturing a product by assembling components of the product together. For instance, assembly tool 201 may be configured to assemble a processor and a memory chip on a printed circuit board (PCB) in the manufacture of a motherboard. In some embodiments, assembly tool 201 may store information pertaining to the assembled product. For instance, assembly tool 201 may store data identifying the assembled product and the components assembled on the product into one or more databases 206. After assembly tool 201 assembles the components together, the assembled product may be sent to test tool 202 for testing of the assembled components. Test tool 202 may be a tool configured to run test sequences to ensure that the product is operational and not defective. Products that fail certain tests in the test sequence may be removed, binned, and prevented from advancing to the next manufacturing process step. The test sequences may include numerous tests where each test examines different aspects of the product's performance.

According to embodiments, a model augmenting system 204 may be coupled to test tool 202 so that model augmenting system 204 can monitor and record data gathered by test tool 202 during testing of the assembled product. In some embodiments, model augmenting system 204 can be a system separate from test tool 202 and coupled to test tool 202 through a communication network. Alternatively, model augmenting system 204 can be contained within an operating system of test tool 202.

In addition to being coupled to test tool 202, model augmenting system 204 can also be coupled to one or more databases 206 containing various types of data, such as attribute data identifying each component assembled on the PCB and manufacturing data generated during manufacturing of the individual components assembled on the PCB. Databases 206 may be all contained in a single database or multiple different databases. For instance, databases 206 may be located in a cloud server. In another instance, each database may be located at a respective manufacturing site of the components assembled into the product being tested by test tool 202. In yet another instance, some of the databases may be located at a testing site of the product being tested.

According to embodiments, model augmenting system 204 may determine a measure of compatibility of the one or more components installed on the product and perform one or more actions in response to the determined measure of compatibility. For instance, model augmenting system 204 may perform one or more actions to accurately predict a lifetime of a product and/or create a customized maintenance plan for a product. As an example, model augmenting system 204 may augment a reliability model for a product so that the augmented reliability model can be used to accurately refine an estimation of a product's lifetime and/or customize a maintenance plan for a product, as will be discussed in detail further herein with respect to FIG. 3.

Figure 3:
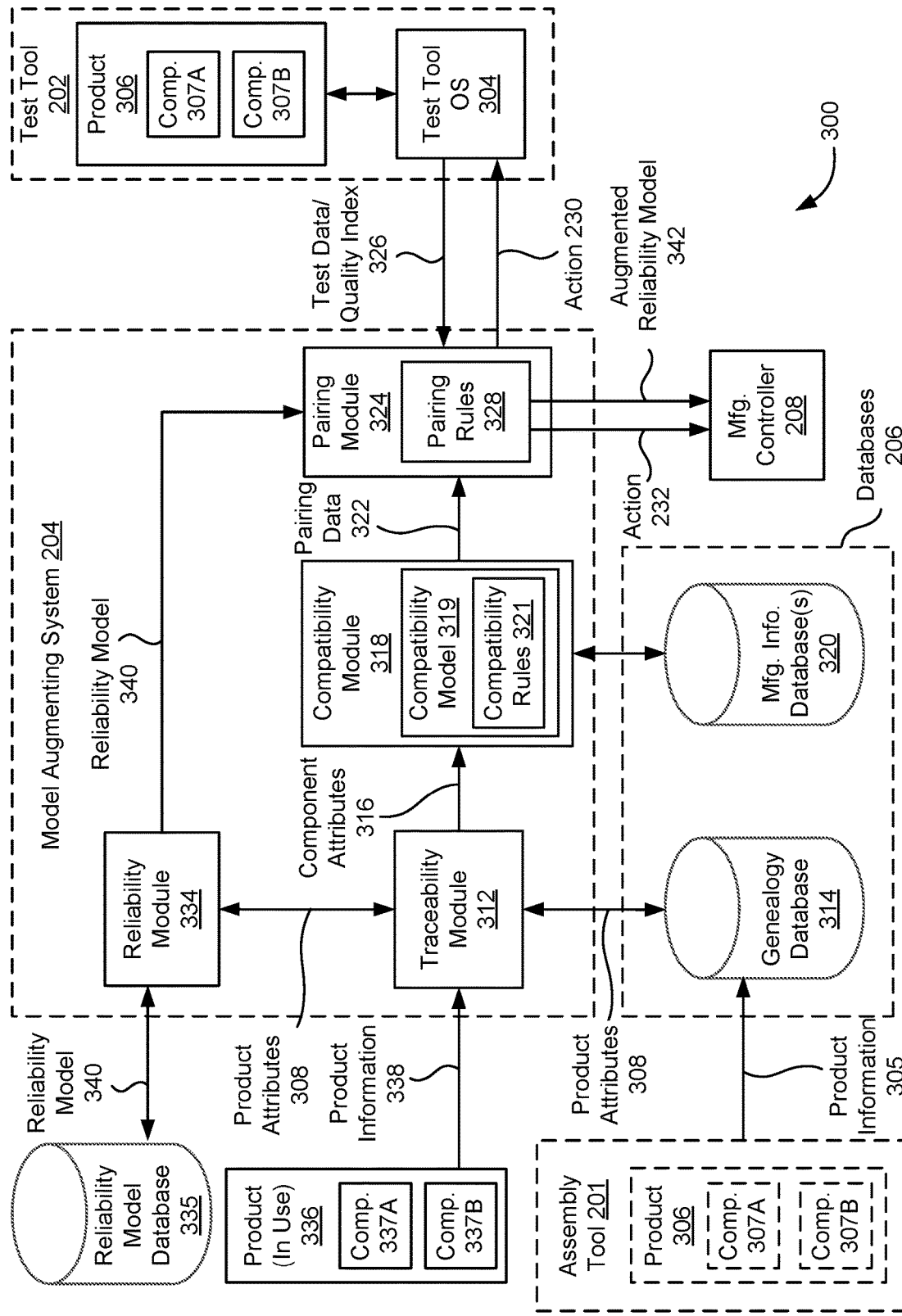
FIG. 3 is a plan view of a block diagram illustrating details of a model augmenting system, according to embodiments of the present invention.

FIG. 3 is a simplified block diagram illustrating details of environment 200 according to embodiments of the present invention. During manufacturing, a product 306 may be tested by test tool 202 after being assembled by an assembly tool 201. Product 306 may be any suitable product mentioned herein formed of two or more components 307A and 307B. As an example, product 306 may be a motherboard including a processor and a memory chip. Test tool 202 may include a test tool operating system 304 that controls the operation of test tool 202 and interacts with product 306. In embodiments, test tool operating system 304 is configured to run test sequences to test the operation of product 306. Product 306 in assembly tool 201 is shown with dashed lines to represent that assembly tool 201 may have assembled product 306 with components 307A and 307B at some point in time prior to testing by test tool 202. During assembly of product 306 by assembly tool 201, product information 305, such as information identifying assembled product 306 and its components 307A and 307B, may be stored in a database for future reference. For example, assembly tool 201 may store the product information 305 into a genealogy database 314.

In embodiments, model augmenting system 204 may communicate with test tool operating system 304. Communication with test tool operating system 304 may be performed over a wireless network or a wired communication line. In some embodiments, model augmenting system 204 may be positioned close to test tool 202 such that a wired communication line may physically couple test tool 202 to model augmenting system 204.

Model augmenting system 204 may include one or more modules for performing a method of augmenting a reliability model according to embodiments of the present invention. For instance, model augmenting system 204 may include a traceability module 312, compatibility module 318, and a pairing module 324 that operate with one another to perform the method of augmenting a reliability model. Even though FIG. 3 illustrates three separate modules for performing the respective functions, embodiments are not limited to such configurations. Additional and alternative embodiments may have more or less modules for performing traceability functions, compatibility functions, and pairing functions. For instance, a single module may be configured to perform all of the functions of traceability module 312, compatibility module 318, and pairing module 324.

A. Traceability Module

In embodiments, traceability module 312 may be coupled to genealogy database 314 to receive one or more articles of information. For instance, traceability module 312 may receive one or more product attributes 308, which may be used to identify a product, such as product 306. Product attributes 308 may be any form of identification of product 306. As an example, product attributes 308 may be a serial number, model number, lot number, die coordinates of a wafer, and the like, that is assigned to product 306 during manufacturing. In some embodiments, product attributes 308 may be more than one article of information. This may be the case when manufacturing of product 306 is performed by different members of a supply chain, who may use different nomenclature to identify product 306 during its manufacture. For example, product attributes 308 may include different forms of identification of product 306 at different manufacturing steps and/or flows performed by different members of the supply chain.

Traceability module 312 may use product attributes 308 to determine one or more components (e.g., components 307A and 307B) assembled in product 306. In some embodiments, traceability module 312 may be configured to trace the assembly of product 306 between manufacturing sub-steps and/or steps within a given manufacturing flow or across multiple manufacturing flows, to determine two or more components assembled in product 306. In embodiments, traceability module 312 may trace the assembly of product 306 by querying a genealogy database 314. As an example, traceability module 312 may provide product attributes 308 to genealogy database 314 and receive from genealogy database 314 attribute data identifying the two or more components assembled in product 306.

In some embodiments, traceability module 312 may query genealogy database 314 (e.g., providing product attributes 308 of the host product to genealogy database 314) and receive from genealogy database 314 attribute data relating to components assembled on the product implemented in the host product. In alternative embodiments, genealogy database 314 may initiate communication with traceability module 312 and proactively send product attributes 308 to traceability module 312 without requiring traceability module 312 to query for product attributes 308. Genealogy database 314 may be a database maintained by a manufacturer of product 306. Thus, genealogy database 314 may be located at the manufacturer's site in some embodiments, or located remotely elsewhere not at the manufacturer's site in other embodiments. Genealogy database 314 may be any suitable database suitable for storing information generated during manufacturing of product 306.

Arrangement of data in genealogy database 314, and the way traceability module 312 traces data in genealogy database 314 is described in U.S. Pat. No. 7,529,695 which is hereby incorporated by reference herein. In this patent, lot tracking is executed by the BUSINESS LOGIC to store detailed information related to a lot in the production supply chain. Lot tracking records the flow of a lot by keeping its genealogy in order to track the lot history. These records include a parent-child relationship for the unsplit lots and include a sibling relationship for split lots. Lot tracking information is loaded, for example, using work-in progress (WIP) or daily transaction report (DTR) information. Lot tracking keeps a complete and consistent data set for all the production related information in one central place. With this common repository of lot information for the entire supply chain, lot tracing may be provided.

In addition to the arrangement of data in genealogy database 314 discussed above, data in genealogy database 314 may include associations between product and components. For instance, during fabrication of a product, a list (or other data structure) of components that are included in the product may be provided to genealogy database 314 so that associations may be established between the components and the product containing the components.

Embodiments herein describe only two ways of associating components and the product containing the components; however, embodiments are not limited to these ways. Any suitable way to associate and track a product and its components that do not depart from the spirit and scope of the present invention are envisioned herein.

Although FIG. 3 illustrates traceability module 312 receiving product attributes 308 directly from genealogy database 314, embodiments are not limited to such configurations. In some embodiments, traceability module 312 may receive product attributes 308 from an intervening device (not shown), such as a manufacturing execution system (MES) or a factory information system (FIS) at a product manufacturing site, that may relay product attributes 308 from genealogy database 314 to traceability module 312.

Once the components (e.g., components 307A and 307B) of product 306 are determined, certain attributes of component 307A and 307B may be outputted by traceability module 312 as component attributes 316. Component attributes 316 may be attributes that identify the two or more components (e.g., components 307A and 307B) assembled in product 306. Similar to product attributes 308, component attributes 316 may be any form of identification of the two or more components. The different variations of attributes discussed with respect to product attributes 308 may apply to component attributes 316 as well.

B. Compatibility Module

According to embodiments, traceability module 312 may be coupled to compatibility module 318 so that component attributes 316 outputted by traceability module 312 may be received by compatibility module 318. Compatibility module 318 may be configured to use component attributes 316 to determine manufacturing data for two or more components, e.g., components 307A and 307B, of product 306. Thereafter, compatibility module 318 may use the manufacturing data to determine a measure of compatibility between the two or more components. In embodiments, compatibility module 318 may apply a compatibility model 319 to the manufacturing data to determine the measure of compatibility. The measure of compatibility may identify a positive, negative, neutral, or an unseen pairing. Details of gathering manufacturing data and applying a compatibility model will now be discussed herein.

1. Manufacturing Data

Compatibility module 318 may be coupled to one or more manufacturing information databases 320 for receiving manufacturing data. For example, compatibility module 318 may query manufacturing information databases 320 (e.g., provide component attributes 318 of two or more components, such as components 307A and 307B, to manufacturing information databases 320) and receive from manufacturing information databases 320 manufacturing data for each component 307A and 307B.

Manufacturing information databases 320 may be one or more databases maintained by one or more manufacturers of each component of the two or more components. For instance, if component 307A is a processor, manufacturing information database 320 may be a database maintained by a manufacturer of the processor. Given that a product may include more than one component, compatibility module 318 may be configured to query and receive manufacturing data from more than one manufacturing information database 320. As an example, if component 307A is a processor and component 307B is a memory chip, manufacturing information database 320 may include two separate manufacturing information databases: one database containing manufacturing data of processor 307A, and one database containing manufacturing data of processor 307B. Each database may be positioned in different locations respective to the manufacturer, or each database may be positioned at a same location or in a cloud network. In an alternative example, each component may not necessarily have its manufacturing data stored in a separate database; rather, one manufacturing information database may include manufacturing data for the two or more components. It is to be appreciated that any number of manufacturing information databases may be accessed by compatibility modules 318 for any number of components assembled on a product.

Manufacturing data may include processing data generated by fabrication equipment involved in the physical construction ("fabrication") of a component, test data generated by testing equipment involved in testing of a component, data generated during rework in fabrication, historical or transactional data generated based on operational information contained in manufacturing execution system (MES) databases and related to history of the manufacturing that is being performed, data generated by a factory information system (FIS). The term manufacturing equipment or equipment may refer to fabrication equipment and/or testing equipment. Note that the manufacturing data for a particular component may possibly cover one or more manufacturing sub-steps, steps and/or flows, and/or one or more instances of in-use testing that may occur in the same and/or in various geographical locations and may be performed by the same and/or by different members of the supply chain. For instance, in some of these examples, manufacturing data associated with a particular component, may have been generated during a manufacturing flow that includes fabrication of the particular component, during manufacturing flow(s) that include fabrication of other components that are included in the particular component, and/or during in-use testing, etc.

In some examples, manufacturing data may include logistical data (collected by (or from) MES through the manufacturing flow(s)) physical measurements (taken during component fabrication phase, during assembly packaging, during PC board manufacturing, etc.), fabrication data generated by fabrication equipment, testing data, manufacturing equipment maintenance data, monitor data, etc.

Ideally, components manufactured from the same process and according to the same process specifications have the same manufacturing data. However, in reality, this is rarely ever true, as some components may have different manufacturing data from other components due to minute process manufacturing variations, even though the components were manufactured by the same process and under the same specifications.

Figure 4A:
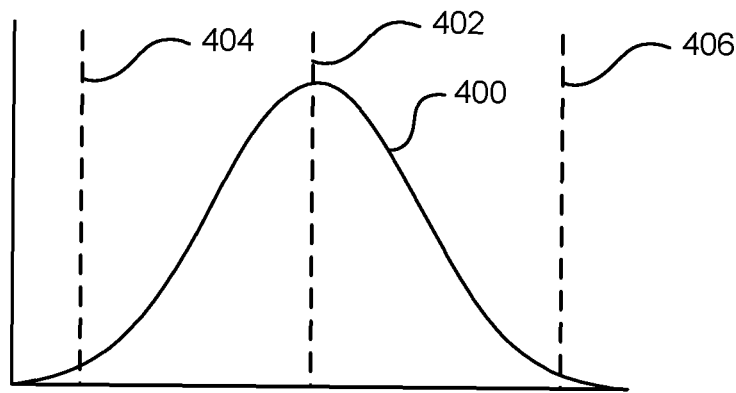
FIG. 4A is a graphical view of a chart illustrating a Gaussian distribution of a population of products.

A representation of manufacturing data for all components manufactured from a manufacturer may be represented by a normal distribution, i.e., a Gaussian distribution 400, as shown in FIG. 4A, uniform distribution, Laplacian distribution, or any other type of statistical distribution. Gaussian distribution 400 may illustrate the approximate manufacturing data of all components manufactured by a single manufacturer. Gaussian distribution 400 is plotted on a chart having an X-axis representing all of the possible manufacturing data variations of a manufactured component, and a Y-axis representing a probability of the corresponding manufacturing data from being observed. Line 402 may represent a center, e.g., peak of distribution; thus, it has the highest probability of being observed. In some embodiments, the center of distribution may be a target specification to which the components are manufactured. Line 404 and 406 may represent the tolerance limits of manufacturing data where components having manufacturing data located between lines 404 and 406 are in specification; and components having manufacturing data located to the left of line 404 or to the right of line 406 are out of specification. Components that have manufacturing data that is out of specification may be declared unfit for use and not implemented in a product. Components that are in specification may be declared fit for us and thus implemented in a product.

Figure 4B:
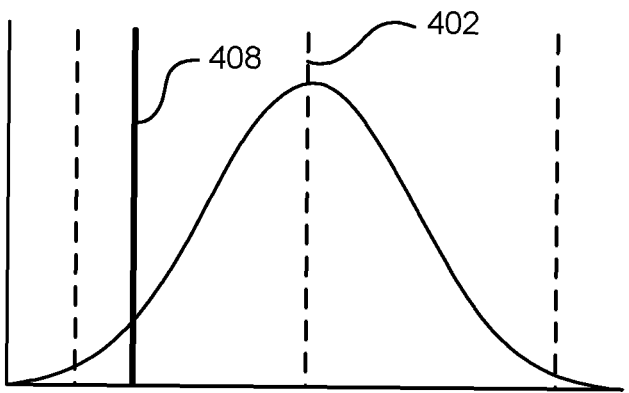
FIG. 4B is a graphical view of a chart illustrating manufacturing data for a product that is one or more standard deviations lower than its center of distribution, according to embodiments of the present invention.
Figure 4C:
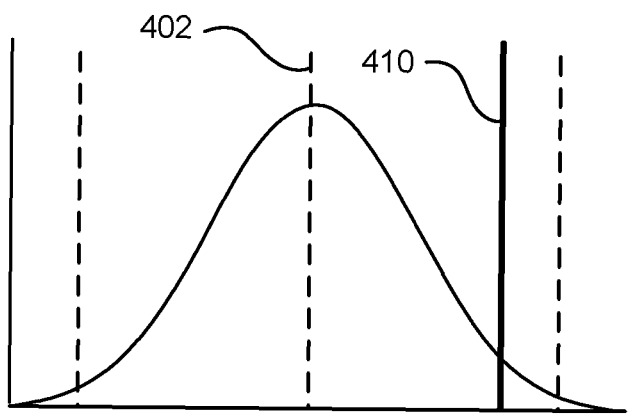
FIG. 4C is a graphical view of a chart illustrating manufacturing data for a product that is one or more standard deviations higher than its center of distribution, according to embodiments of the present invention.

Given that components may have different manufacturing data as a result of real-world manufacturing processes, an in-specification component selected at random may fall somewhere between lines 404 and 406. As an example, a component that is selected at random may have manufacturing data that is one or more standard deviations to the left of center of distribution 402, as shown by line 408 in FIG. 4B. This component may be, for instance, a processor that has a maximum processing speed that is relatively low due to manufacturing variations, a memory chip that has a maximum clock speed that is relatively low, or any other component that has manufacturing data one or more standard deviations below the center of distribution but within specification. In another example, a component that is selected at random may have manufacturing data that is one or more standard deviations to the right of center of distribution 402, as shown by line 410 in FIG. 4C. This component may be, for instance, a processor that has a maximum processing speed that is relatively high, a memory chip that has a maximum clock speed that is relatively high, or any other component that has manufacturing data one or more standard deviations above the center of distribution but within specification.

With reference back to FIG. 3, compatibility module 318 may receive detailed manufacturing data regarding the characteristics and properties of components 307A and 307B from manufacturing information databases 320. According to embodiments of the present invention, this manufacturing data received may be used by compatibility module 318 to determine a measure of compatibility of the pairing of components 307A and 307B. For instance, compatibility module 318 may apply a compatibility model 319 to the manufacturing data of components 307A and 307B. The measure of compatibility expresses the effect of the pairing of the components on expected performance of the product containing the two or more components. The effect can be neutral (e.g., the pairing performs on par with the expected performance of the product), positive (e.g. the pairing performs better than the expected performance of the product), negative (e.g. the pairing performs worse than the expected performance of the product) or unseen (e.g. the effect of the pairing on the expected performance of the product is not known because the pairing has not been seen before or that it has occurred before but was not noticed, recorded or studied). The combination of two or more components for a given effect may be determined according to a business model. The measure of compatibility may be an integer, parameter, variable, percentage, probability, index, rank, or a Boolean value expressing the effect of the pairing of the two or more components (e.g., 307A and 307B). In some embodiments, the measure of compatibility may be a value of a continuous scale ranging between two opposite pairings, such as between a negative pairing and a positive pairing.

A neutral pairing may indicate that the two or more components together perform within expectations, e.g., the pairing does not change the expected performance of the product containing the two or more components. The combination of two or more components for a neutral pairing may be determined according to a business model. Thus, the business model may indicate what type of pairing is expected. For instance, the business model may define an expected performance of a product. The expected performance of a product may define what performances from the paired components are to be expected, and those pairings that fall within the expectation may be determined to be a neutral pairing. As an example, if an expected performance of a product is achieved by a pairing between an average processor and an average memory chip, then a neutral pairing may be determined upon a pairing between an average processor and memory chip. In another instance, if an expected performance of a product is achieved by a pairing between a slow processor and a slow memory chip, then a neutral pairing may be determined upon a pairing between a slow processor and memory chip. It is to be appreciated that a neutral pairing may be any pairing that achieves the expected performance.

A positive pairing may indicate that the two or more components together perform better than an expected performance. Determination of whether the pairing is a positive pairing is performed relative to the expected performance. As an example, if an expected performance is achieved by a pairing between an average processor and an average memory chip, then a positive pairing may be determined upon a pairing between a fast processor and a fast memory chip. In another example, if an expected performance is achieved by a slow processor and a slow memory chip, then a positive pairing may be determined upon a pairing between an average processor and an average memory chip, an average processor and a fast memory chip, a fast processor and an average memory chip, or a fast processor and memory chip.

On the other hand, a negative pairing may indicate that the two or more components together perform worse than an expected performance. Similar to the positive pairing, determination of whether the pairing is a negative pairing is performed relative to the expected performance. For example, if an expected performance is achieved by a pairing between an average processor and an average memory chip, then a negative pairing may be determined upon a pairing between a slow processor and a slow memory chip, a slow processor and an average memory chip, or an average processor and a slow memory chip.

An unseen pairing may indicate that the measure of compatibility for the two or more components is not known because the pairing has not been seen before or that it has occurred before but that it was not noticed, recorded, or studied. In such instances, a measure of compatibility may not be determined based upon the pairing of the two or more components. As a result, the product having the unseen pairing of two or more components may be flagged for dispositioning, such as monitoring, as will be discussed further herein.

In embodiments, determining a neutral, positive, negative, or unseen pairing may at least in part be based upon threshold amounts of standard deviations. Details of the operation of compatibility model 319 is discussed herein.

2. Compatibility Model

According to embodiments, a compatibility model, e.g., compatibility model 319, may be a model used by a compatibility module for evaluating a set of manufacturing data corresponding to two or more components. In some embodiments, the compatibility model may indicate what type of manufacturing data should be requested from the manufacturing database in order to be included in the set of manufacturing data. This prevents the compatibility module from having to request every type of manufacturing data, thereby saving process time. The compatibility module may determine a calculated result after applying the compatibility model to the set of manufacturing data. In embodiments, compatibility model 319 may include a set of compatibility rules 321 that may establish a relationship between one or more criteria and one or more calculated results. The calculated result may be a metric reflecting the measure of compatibility between the two or more components assembled for a product.

FIGS. 5A-5D illustrate examples of an operation of a compatibility model according to embodiments of the present invention. Specifically, each figure illustrates a set of manufacturing data for two components: component A and component B, and a resulting metric as a result of an evaluation of the set of manufacturing data according to a compatibility model executed by a compatibility module, e.g., compatibility module 318 in FIG. 3. The manufacturing data for each component is illustrated as a line superimposed over a Gaussian distribution to show its relationship with respect to a general population of corresponding components. Component A and component B may each be a single component or a product containing multiple components of its own, as discussed herein.

In an exemplary scenario illustrated in FIG. 5A, component A 502 and component B 504 may be assembled in a product. Manufacturing data of component A 502 and component B 504 indicate that they are both approximately within an expected range (e.g., a range centered around a peak of a distribution representing the general population of corresponding components). In such situations, a set of compatibility rules applied by a compatibility model may indicate that this pairing would substantially limit the capabilities of component B 504. For instance, if component A 502 is a memory chip having an operational speed that is below a threshold number of standard of deviations away from the center of its distribution and component B 504 is a processor having a processing speed that is also below a threshold number of standard of deviations away from the center of its distribution, pairing the processor with the memory chip may result in a product that performs within expectations and according to what is desired by a business model. Accordingly, the compatibility model may output a neutral metric 506. Although FIG. 5A illustrates that a neutral pairing is determined when component A 502 and component B 504 are both within an expected range that is centered around a peak of a distribution, embodiments are not so limited. Other embodiments may determine that a neutral pairing occurs when components A and B are one or more standard deviations above or below the centers of their respective distributions according to a business model, as discussed herein with respect to FIG. 3.

In embodiments, the threshold number of standard deviations may be determined by the performance and/or reliability requirements of a product. Products that are expected to have high performance and/or reliability may have the threshold number of standard deviations be set at a low number of standard deviations, such as one or two standards of deviations from its center of distribution. However, products that are not expected to have high performance and/or reliability may have the threshold number of standard deviations be set at a higher number of standard deviations, such as four or five standards of deviations from its center of distribution. It is to be appreciated that the threshold number of standard deviations may be tailored according to a desired performance and/or reliability of a product and selected to be within manufacturing specification, e.g., within the tolerance limits represented by lines 404 and 406 in FIG. 4A.

In another scenario illustrated in FIG. 5B, component A 512 and component B 514 may be assembled in a product. Manufacturing data of component A 512 indicates that it is one or more standard deviations higher than its center of distribution, and manufacturing data of component B 514 indicates that it is also one or more standard deviations higher than its center of distribution. In such situations, a set of compatibility rules applied by a compatibility model may indicate that this pairing would result in a product that performs better than components in a neutral pairing. For instance, if component A 512 is a memory chip having an operational speed that is a threshold number of standard of deviations higher than its center of distribution and component B 514 is a processor having a processor speed that is a threshold number of standard of deviations higher than its center of distribution, pairing a fast memory chip with a fast processor may result in a situation where the product operates at a fast speed altogether, resulting in a relatively superior product when compared to a product having components that have a neutral pairing metric. In such embodiments, it would be beneficial to have this pairing in a product that will constantly require maximum performance from components A and B, 512 and 514. Accordingly, the compatibility model may output a positive metric 516.

FIG. 5C illustrates another exemplary scenario in which component A 522 and component B 524 are assembled in a product. Manufacturing data of component A 522 indicates that it is a threshold number of standard of deviations lower than its center of distribution, and manufacturing data of component B 524 indicates that it is also a threshold number of standard of deviations lower than its center of distribution. In such situations, the set of compatibility rules applied by the compatibility model may indicate that, although this pairing would not substantially limit the capabilities of either component, this pairing would result in a slow product (relatively speaking as it is still within specification). In such circumstances, it would not be beneficial to have this pairing in a product that will constantly require maximum performance from components A and B, 522 and 524. Accordingly, the compatibility model may output a negative metric 526.

Yet another exemplary scenario is illustrated in FIG. 5D, where component A 532 and component B 534 are assembled in a product. Manufacturing data of component A 532 indicates that it is one or more standard deviations higher than its center of distribution, and manufacturing data of component B 534 indicates that it is one or more standard deviations lower than its center of distribution. In embodiments, this pairing arrangement may not have been seen or encountered before, or may have been encountered before but not realized or monitored. In such situations, the set of compatibility rules applied by the compatibility module may indicate that this pairing is unseen and thus output an unseen metric 536, which is a metric that indicates the pairing has not been seen before.

Figure 5E:
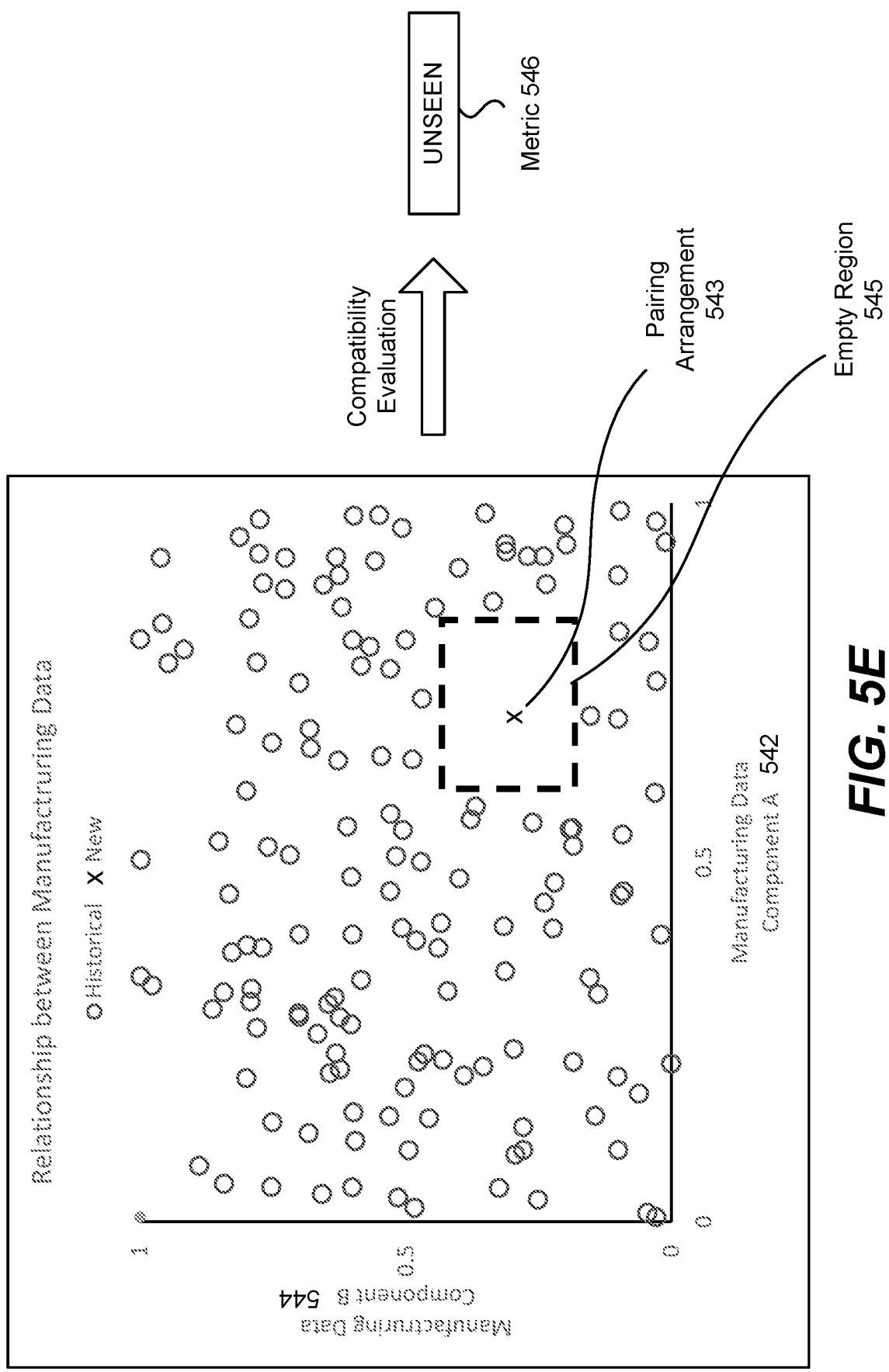

Yet another exemplary scenario is illustrated in FIG. 5E, where component A 542 and component B 544 are assembled in a product. Pairing arrangement 543 of manufacturing data for component A 542 and B 544 may fall into an empty region 545 within the data that has been collected before for similarly assembled products. In FIG. 5E empty region 545 is a rectangle but it is understood that the region can have other shapes. It is also understood that a similar concept of a hyper-rectangle, may exist in a multidimensional space in cases of multiple components or parameters. The methodology for identifying one or more empty hyper-rectangles in multi-dimensional space is described in "Mining for Empty Rectangles in Large Data Sets," ICDT 2001, LNCS 1973, pp. 174-188, 2001. In embodiments, pairing arrangement 543 may not have been seen or encountered before. In such situations, the set of compatibility rules applied by the compatibility module may indicate that this pairing is unseen and thus output an unseen metric 536. It is understood that other multivariate outlier detection methods can be used for identifying pairing arrangements that may not have been seen or encountered before.

In embodiments, the compatibility model may be process tasks that apply a set of compatibility rules 321 to manufacturing data. Compatibility rules 321 may be configured to determine which combinations of two or more components result in a certain quality of pairing (e.g., a neutral pairing, a positive pairing, a negative pairing, or an unseen pairing). In some embodiments, the compatibility model may be a process task implemented by lines of code stored in memory that is executed by a processor.

The compatibility model may be programmed by a designer knowledgeable about the relationship between performance of a product and a pairing of the sets of manufacturing data of two or more components assembled in the product. For instance, a technician employed by the manufacturer of a product may program the compatibility model to assign high metrics for pairings of two or more components with relatively high performance, and low metrics for pairings of two or more components with relatively low performance or for pairings where only one of the two or more components have relatively low performance. In order for the compatibility model to be programmed by a technician, knowledge of the relationship between performance of the product and the pairing of the sets of manufacturing data of the two or more components assembled in the product must be known by the technician or at the very least, readily available to the technician as a reference.

This knowledge, however, may in some cases not be known or readily available. Thus, it may be necessary to deduce this relationship to build a relationship model by analyzing a population of already-manufactured products. The strategy for deducing this relationship may depend on whether performance of each product (e.g., whether the product performs well, or does not perform well) in the population is understood or not understood, and whether the set of manufacturing data for the components assembled on the product is known or not known. If the performance of products in the population is understood and the manufacturing data of the components assembled on the product that affect the performance is not known, then the relationship may be defined by solving a classification or regression problem. However, if the affected performance of products in the population is not understood or not studied and the manufacturing data of the components assembled on the product is known or has been identified, then the relationship may be determined by performing an equivalency test (T-test or similar) or solving a regression problem. Furthermore, if the performance of products in the population is not understood or not studied and the manufacturing data of the components assembled on the product that may affect performance is also not known, then the relationship may be determined by first performing a multivariate outlier detection method in order to identify a set of manufacturing data of the components for studying.

a) Known Expected Performance of a Product and Unseen Manufacturing Data for Components Assembled in the Product Affecting the Performance If the performance of products in the population is understood and the manufacturing data of the components assembled on the product that affect the performance is not known, then determining the relationship between performance of a product and the pairing of the components assembled on the product may be achieved through predictive modeling (often referred to as predictive analytics) which use statistics to predict outcomes. Some exemplary statistical analyses include statistical classification and regression analysis, although other suitable analyses may be used for determining the relationship.

Statistical classification identifies to which set of categories a new observation belongs. Products having similar expected performances may be grouped together and the manufacturing data for the different groups may be analyzed to determine similarities in the manufacturing data within the groups of products. For instance, one group may include products that perform above an expected performance and another group may include products that perform below the expected performance, and then a relationship between the two or more components of each product within each group of products may be determined.

A plurality of manufacturing data may be analyzed for both groups of products in order to build a compatibility model. The compatibility model may define a relationship between the expected performance of a product and the set of manufacturing data that results in the expected performance of the product. For example, within the group of tablets that have fast speeds, it may be determined that most of the products have both fast processors and fast memory chips (i.e., components). Thus, the compatibility model may define a relationship between fast tablets and a pairing between fast processors and fast memory chips. Alternatively, within the group of tablets that have slow speeds, it may be determined that most of the products have at least one component that is slow (e.g., a slow processor, a slow memory chip, or both a slow processor and memory chip). Thus, the compatibility model may define a relationship between slow tablets and a pairing between processors and memory chips where at least one component is slow.

In some instances, there may be numerous types of manufacturing data (e.g., operational speed, power utilization, component size, etc.) to analyze through. Some types of manufacturing data do not have similarities between products within each group, while other types of manufacturing data do have similarities between products within each group. Those types manufacturing data that are similar within the group of products may be identified as notable types of manufacturing data and saved as part of the compatibility model. Thus, in future instances where manufacturing data is received from manufacturing information database 320, only those types of manufacturing data that are notable may be received, instead of having to receive the entire set of manufacturing data which may include types of manufacturing data that are not particularly useful in determining a compatibility between two products.

In addition to statistical classification, regression analysis may be performed to determine a relationship between performance of a product and the pairing of the components assembled on the product when performance of products in the population is understood and the set of manufacturing data for the components affecting the performance assembled on the product is not known. In regression analysis, a plurality of manufacturing data is analyzed in conjunction with the performance of the products in order to establish a relationship between the observed performance of a product and a set of manufacturing data of the components assembled on the product. Performing regression analysis identifies the set of manufacturing data explaining most of the variation in performance data.

b) Unseen Affected Performance of a Product and Known Manufacturing Data for Components Assembled in the Product If the affected performance of products in the population is not known or not studied and the manufacturing data of the components assembled on the product is known or has been identified, then determining the relationship between performance of a product and the pairing of the components assembled on the product may be achieved through statistical analyses, such as an equivalency test.

The equivalency test is suitable for instances where there is a group of products with paired components that have a set of manufacturing data that is different from a set of manufacturing data for another group of products. In such situations, a plurality of product performance data may be compared between the groups in order to detect if there is a statistically significant difference between the groups. Those performance data for which the difference is significant may be used to build a compatibility model defining the relationship between the products' performance data and the set of manufacturing data. In addition to utilizing the equivalency test, other suitable tests may be utilized as well. For instance, a regression analysis (discussed herein) may be used to define a compatibility model when the expected performance of products in the population is unseen and the manufacturing data of the components assembled on the product is known.

c) Unseen Affected Performance of a Product and Unseen Manufacturing Data for Components Assembled on the Product Affecting the Performance If the performance of products in the population is unseen or not studied and the manufacturing data of the components assembled on the product that may affect the performance is also not known, then the relationship may be determined by first performing a multivariate outlier detection method in order to identify a set of manufacturing data of the components for studying.

A multivariate outlier detection may be used in order to identify manufacturing data for the given product that is different from the manufacturing data for similar products, e.g. the manufacturing data that falls into an empty region in previously observed manufacturing data. Once a manufacturing data that is identified as an outlier, it may be further analyzed in order to determine the relationship between performance of a product and the pairing of the components assembled on the product by using methodology described herein.

Although examples discussed herein with respect to determining a compatibility model refer to only one parameter for each product (e.g., tablet speed), one parameter for each component (e.g., processor speed and memory speed), and two components (e.g., processor and memory chip) embodiments are not limited to such configurations. For instance, other examples may be expanded to include analysis of more than one parameter for each product (e.g., power, critical dimension, etc.), more than one parameter for each component (e.g., power, critical dimension, etc), and more than two components (e.g., three, four, five, etc. components). In cases of multiple product parameters and/or multiple component parameters, a multi-dimensional model, e.g., principal component analysis (PCA), may first be employed in order to reduce the dimensionality of the data.

With reference back to FIG. 3, once the metric of the pairing of two or more components is determined, the metric may be outputted by compatibility module 318 as pairing data 322. Pairing data 322 may represent the anticipated quality of the product given the pairing of the two or more components 307A and 307B as determined by compatibility module 318.

C. Pairing Module

In embodiments, compatibility module 318 may be coupled to pairing module 324 so that pairing data 322 outputted by compatibility module 318 may be received by pairing module 324. Furthermore, pairing module 324 may be coupled to test tool operating system 304 to receive test data and/or a quality index of product 306 as a result of test sequences performed by test tool operating system 304 and pairing module 324 may be coupled to manufacturing controller 208 to alter a manufacturing process of product 306. Pairing module 324 may be configured to use pairing data 322 and/or test data/quality index to determine one or more actions 230 and 232 in response to pairing data 322, and then send the determined one or more actions 230 and 232 to test tool operating system 304 or manufacturing controller 208. Manufacturing controller 208 can be a controller for managing the manufacturing of product 306. For instance, manufacturing controller 208 can manage the operations of assembly tool 201, test tool 202, and any other tool associated with manufacturing product 306. Test tool operating system 304 or manufacturing controller 208 can then perform the one or more actions determined by pairing module 324, as will be discussed further herein.

In embodiments, pairing module 324 may apply a set of pairing rules 328 to pairing data 322 and/or test data/quality index 326 to determine the one or more actions. Set of pairing rules 328 may be a set of evaluation rules that determine one or more actions based upon a set of criteria. As an example, set of pairing rules 328 may determine that if (1) pairing data 322 is a positive quality metric (indicating that the pairing of components 307A and 307B is a positive pairing), and if (2) test data/quality index is also positive, then pairing module 324 may send an action 230 to test tool operating system 304 to stop or minimize further testing because it can be determined that product 306 will be a high quality product, which may be known herein as adaptive testing. By minimizing further testing, test time can be reduced, thereby saving manufacturing cost. In some embodiments, action 230 may also be a command that instructs test tool 304 to alter test data/quality index of product 306, such as augmenting the test data due to the positive pairing. In certain embodiments where pairing data 322 indicates that the measure of compatibility is a neutral pairing, then action 230 may not alter test data/quality index of product 306 because the pairing results in a product that has an expected performance that does not require modification of a manufacturing process.

In some embodiments, pairing module 324 may additionally or alternatively send an action 232 to manufacturing controller 208 to augment a workflow for product 306, which may be known herein as adaptive manufacturing. For instance, action 232 may command manufacturing controller 208 to instruct a subsequent manufacturing tool to perform adaptive repair, such as using software modifications to compensate for the limitations of the item based upon specific types of negative pairing combinations. In another instance, action 232 may command manufacturing controller 208 to instruct a subsequent manufacturing tool to flag product 306 for some type of special treatment/dispositioning (e.g., monitoring use by an end-user, additional stress testing, etc), a different replacement schedule for maintenance of the final product, to modify provisioning (e.g. enabling different functionality) of the product, or any other targeted actions down the supply chain. An in yet another instance, action 232 may command manufacturing controller 208 to instruct a subsequent manufacturing tool to implement product 306 in an alternative finished product than originally planned, which may be known herein as adaptive provisioning. For example, if product 306 is a processor that was originally planned to be installed in a gaming computer (e.g., the finished product), but the pairing of the components within the processor was negative (e.g., weak power supply is paired with a power hungry oscillator), action 232 may command manufacturing controller 208 to implement the processor in another finished product that may rarely demand as much as a gaming computer, such as a tablet or a smart phone. The finished product may be a device within which product 306 is ultimately installed.

In some embodiments, action 232 may command manufacturing controller 208 to modify an attribute of the product, such as update its manufacturing data. In other embodiments action 232 may command manufacturing controller 208 to issue a report. A report may be issued to the manufacturer of product 306 to indicate that some of its products do not pair well in some circumstances. Thus, the product manufacturer can change their product so that less negative pairings may occur. In additional embodiments, the report may cause the product manufacturer to send out updates to modify products already in use by a customer. The manufacturer may augment the performance or a feature set of products by updating its firmware to adapt its operation according to the newly discovered performance of the product's components. This may be known herein as augmented provisioning. In additional embodiments, a report may be issued to the manufacturers of components 307A or 307B to indicate that some of their components do not pair well in some circumstances. Thus, at least one of the components manufacturer can change their center of distribution so that less negative pairings may occur.

In certain embodiments, pairing module 324 can also augment a reliability model for a product under test, e.g., product 306. In such embodiments, pairing module 324 can be coupled to a reliability module 334 and be configured to receive a reliability model 340 from reliability module 334. Reliability model 340 can be a model that represents an expected lifetime of an entire population of products that includes product 306. For instance, if product 306 is a laptop XYZ, then reliability model 340 is a model that represents an expected lifetime of the entire population of laptop XYZ. Reliability model 340 can be stored in a reliability model database 335 and retrieved by reliability module 334 when reliability module 334 identifies what product is being tested, such as by receiving product attributes 308 of product 306. Reliability model database 335 can be a database that stores reliability models for general populations of each product manufactured by the manufacturer. For instance, reliability model 335 can store reliability models for the general population of laptop XYZ, laptop ABC, smartphone XYZ, and the like. In some embodiments, traceability module 312 can relay product attributes 308 of product 306 to reliability module 334, which can then in turn query reliability model database 335 for reliability model 340 corresponding to the general population of products that include product 306.

According to certain embodiments of the present disclosure, pairing module 324 can use pairing data 322 to modify reliability model 340. As shown in FIG. 3, pairing module 324 can use pairing data 322 to modify reliability model 340 into augmented reliability model 342 based on pairing data 322. For instance, if pairing data 322 indicates that a pairing of two components, e.g., components 307A and 307B, results in a positive metric, e.g., positive metric 516 discussed herein with respect to FIG. 5B, then it can be expected that the product within which the two components are paired may perform better than a product having components in a neutral metric pairing. In that case, augmented reliability model 342 can be used to determine a more accurate expected useful lifetime by modifying the expected useful lifetime based on reliability model 340. For instance, if the expected useful lifetime of the population of products including product 306 is determined based on the reliability model 340 to be 5 years from the manufacturing date, the expected useful lifetime can be individually established for product 306 according to pairing data 322. In this example, pairing data 322 is a positive metric. Thus, augmented reliability model 342 will result in a longer expected useful lifetime, such as 6 years. Similarly, if pairing data 322 indicates that the pairing of components 307A and 307B results in a negative metric, e.g., negative metric 526 discussed herein with respect to FIG. 5C, then augmented reliability model 342 will result in a shorter expected useful lifetime, such as 4 years. Augmented reliability model 342 can also be used to determine a customized maintenance plan for product 306. For instance, if the maintenance plan for the population of products including product 306 determined based on the reliability model 340 requires replacement of component 307A and/or 307B every 5 years from the manufacturing date, the maintenance plan can be individually customized for product 306 according to pairing data 322. If pairing data 322 is a positive metric, augmented reliability model 342 will result in a maintenance plan that requires replacement of component 307A and/or 307B at longer intervals, such as every 6 years from the manufacturing date. Similarly, if pairing data 322 indicates that the pairing of components 307A and 307B results in a negative metric, e.g., negative metric 526 discussed herein with respect to FIG. 5C, then augmented reliability model 342 will result in a maintenance plan that requires replacement of component 307A and/or 307B at shorter intervals, such as every 4 years from the manufacturing date.

Augmented reliability model 342 can be outputted by pairing module 324 to manufacturing controller 208. In some embodiments, manufacturing controller 208 can receive augmented reliability model 342 and determine an accurate useful life of product 306 and/or generate a customized maintenance plan specific to product 306 as aforementioned herein. The customized maintenance plan can then be assigned to product 306 so that when product 306 is purchased by an end user, the end user can be accurately apprised of the product's useful lifetime and can follow a customized maintenance plan individually tailored to product 306. Accordingly, product 306 can be maintained according to its unique characteristics so that it does not prematurely fail (e.g., when the customer follows a general maintenance plan that is not sufficient to maintain a product with components that have a negative pairing metric) and does not cost more to maintain necessary (e.g. when the customer follows a general maintenance plan that is overly aggressive for a product with components that have a positive pairing metric).

In addition to augmenting a reliability model for a product under test during manufacturing, pairing module 324 can also augment a reliability model for a product in use by an end user after manufacturing so that the expected useful life of a product and/or a maintenance plan for a product can be dynamically updated in real time. As shown in FIG. 3, a product 336 can be in use by an end user after it has been manufactured. Product 336 can include components 337A and 337B that are installed in product 336 during manufacturing. Similar to disclosures herein with respect to a product under test, product information 338 of product 336 can be received by traceability module 312. Product information 338 is similar to product information 305 in that product information 338 can be information identifying assembled product 336 and its components 337A and 337B. Traceability module 312 can access genealogy database 314 to acquire product attributes 308 of product 336 and relay product attributes 308 to reliability module 334. Reliability module 334 can receive product attributes 308 of product 336 and query reliability model database 335 for reliability model 340. In some embodiments, reliability model 340 can be a reliability model designed for the general population of products including product 336. In other embodiments, reliability model 340 can be a modified reliability model that is specific to product 336. The modified reliability model can be a reliability model for the general population of products including 336, but modified according to in-use data (not manufacturing data of components 337A and 337B) from product 336. Pairing module 324 can receive reliability model 340 and pairing data 322 of product 336 and augment reliability model 340 based on pairing data 322 (determined by methods discussed herein based on manufacturing data of components 337A and 337B) to generate augmented reliability model 342, such that augmented reliability model 342 is unique to product 336. Augmented reliability model 342 can then be used to determine a remaining useful lifetime of product 336, and/or determine a customized maintenance plan.

In addition to using pairing data and an augmented reliability model for estimating remaining lifetime of a product and/or customizing a maintenance plan, embodiments herein can use an augmented reliability model to modify/customize a data collection method for a single product. Typically, sensor data from a product in-use can include a variety of parameters, such as processor speed, power consumption, memory space, and the like. However, collecting, transmitter, and processing all of these parameters can result in negative implications on product performance. For instance, the product may consume more power, may use up more bandwidth, may hinder user experience, and the like, or the product may not be sufficiently monitored. Thus, the augmented reliability model can be used to customize a data collection method that is specific to the product as an individual. For instance, if the augmented reliability model indicates that the product is expected to underperform, then a more intensive data collection method can be implemented for that specific device, such as increasing the frequency at which sensor data is collected. Conversely, if the augmented reliability model indicates that the product is expected to overperform, then a less intensive data collection method can be implemented for that specific device, such as decreasing the frequency at which sensor data is collected. In another example, if the pairing data indicates that there is a negative pairing between two components, then the data collection method can increase the frequency at which sensor data is collected for those two components only.

Embodiments herein can also use an augmented reliability model to modify/customize a data collection method for an entire population of products. In some cases, a manufacturer may wish to evaluate the performance of a large population of products that are currently in use by an end user by monitoring a representative sample of the population. To determine a representative sample of the population, the manufacturer may use the augmented reliability models of the products to tailor the sampling plan to the expected performance of the individual products. For example, the manufacturer may want to ensure that the representative sample includes overperforming and underperforming products.

It can be appreciated that a model augmenting system enables a manufacturer to better estimate an expected lifetime of each individual product, not only for the general population of a specific product. As discussed herein, the model augmenting system can analyze the quality of pairing (e.g., pairing data) between two or more components assembled for a product by performing the method of smart pairing discussed herein, and use the quality of pairing to augment a reliability model originally designed for a general population into an augmented reliability model that is designed for the individual product. Thereafter, the model augmenting system can perform one or more actions with the augmented reliability model. For instance, the model augmenting system can more accurately predict an expected and/or remaining lifetime of a product. In another instance, the model augmenting system can customize a maintenance plan designed for the individual product. The maintenance plan can be stored in a product such that it can be maintained according to a more accurate plan, thereby increasing the lifetime of the product.

III. Method of Smart Pairing

Figure 6:
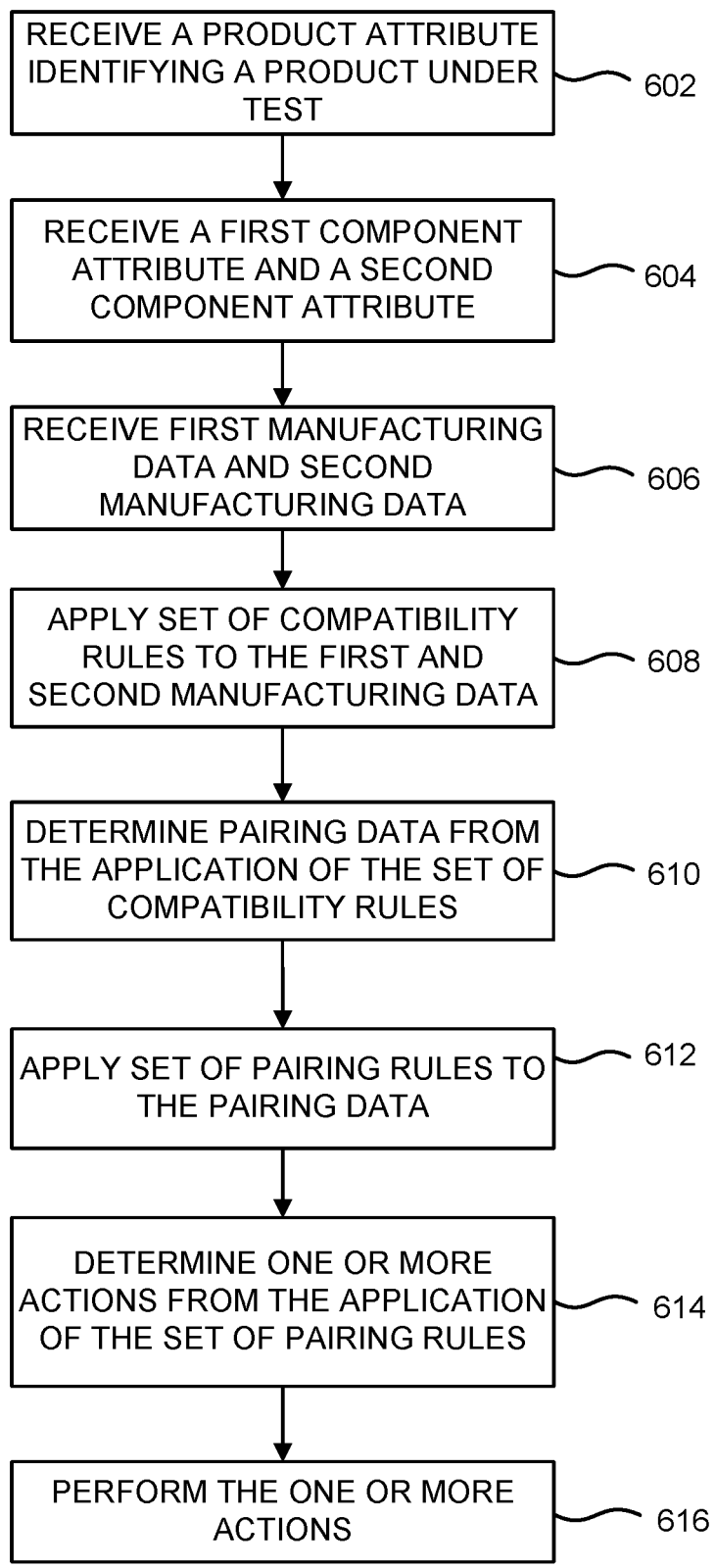
FIG. 6 is a plan view illustration of a flow chart for a method of smart pairing, according to embodiments of the present invention.

FIG. 6 is a flow chart illustrating a block diagram of a method of smart pairing according to embodiments of the present invention. At block 602, a product attribute identifying a product under test is received. For instance, traceability module 312 of model augmenting system 204 may receive product attribute 308 from test tool operating system 304, as discussed herein with respect to FIG. 3. The product attribute may be a serial number, model number, lot number, die coordinates of a wafer, and the like, that is assigned to a product under test, e.g., product 306 in FIG. 3, during manufacturing.

At block 604, a first component attribute and a second component attribute may be received. The first and second component attributes may identify two components assembled on the product. As an example, compatibility module 318 of model augmenting system 204 may receive the first and second components attributes (e.g., component attributes 316) from traceability module 312, as discussed herein with respect to FIG. 3. Similar to product attributes, component attributes may be any form of identification of the two or more components.

Thereafter, at block 606, first manufacturing data and second manufacturing data may be received. The first and second manufacturing data may be the manufacturing data for the first and second components, respectively. Manufacturing data be any data acquired during manufacturing of the component, as already discussed in detail herein under the section entitled "Manufacturing Data" with respect to FIG. 3. In embodiments, compatibility module 318 may receive the first and second manufacturing data from a manufacturing information database, e.g., manufacturing information database 320, as discussed herein with respect to FIG. 3.

Once the first and second manufacturing data is received, at block 608, a set of compatibility rules may be applied to the first and second manufacturing data. In embodiments, the set of compatibility rules may be established by a compatibility model implemented in a compatibility module. For instance, a set of compatibility rules may be contained within compatibility model 319 of compatibility module 318, as discussed herein with respect to FIG. 3. The set of compatibility rules may be used to determine a quality metric of a pairing of two or more components, as discussed herein with respect to FIGS. 5A-5D.

At block 610, pairing data may be determined from the application of the compatibility rules to the first and send manufacturing data. The pairing data may be determined by a compatibility module, e.g., compatibility module 318 in FIG. 3, upon application of the compatibility rules contained in compatibility model 319. In embodiments, the pairing data may be a quality metric representing a measure of quality of pairing between components in a product. Pairing data may be a simple Boolean value indicating whether the pairing is a neutral pairing, a positive pairing, a negative pairing, or an unseen pairing. In some embodiments, pairing data may be a value representing a quality metric across a broad spectrum ranging between positive and negative quality metrics.

Thereafter, at block 612, the set of pairing rules may be applied to the pairing data. In embodiments, the set of pairing rules may be contained within a pairing module, e.g., pairing module 324 in FIG. 3. The set of pairing rules may be configured to determine one or more actions to be performed based on the pairing data.

Then, at block 614, one or more actions may be determined by applying the set of pairing rules. For instance, pairing module 324 may apply set of pairing rules 328 to pairing data 322 to determine the one or more actions, e.g., action 230 and/or actions 232, as discussed herein with respect to FIG. 3. Once the one or more actions are determined, then the one or more actions may be performed at block 616. For instance, a test tool may alter a test sequence applied to a product under test, or a manufacturing controller may alter a manufacturing process for product 306, as discussed herein with respect to FIG. 3. In some embodiments, the one or more actions may flag the product for dispositioning its in-field use by an end-user, such as when the pairing data indicates that the pairing is an unseen pairing. The performance of the product may be monitored, and the information gathered during use by an end-use may be fed back to modify the set of compatibility rules in the compatibility model and/or the set of pairing rules in the pairing module, as aforementioned herein.

IV. Method of Augmenting Reliability Models

Figure 7:
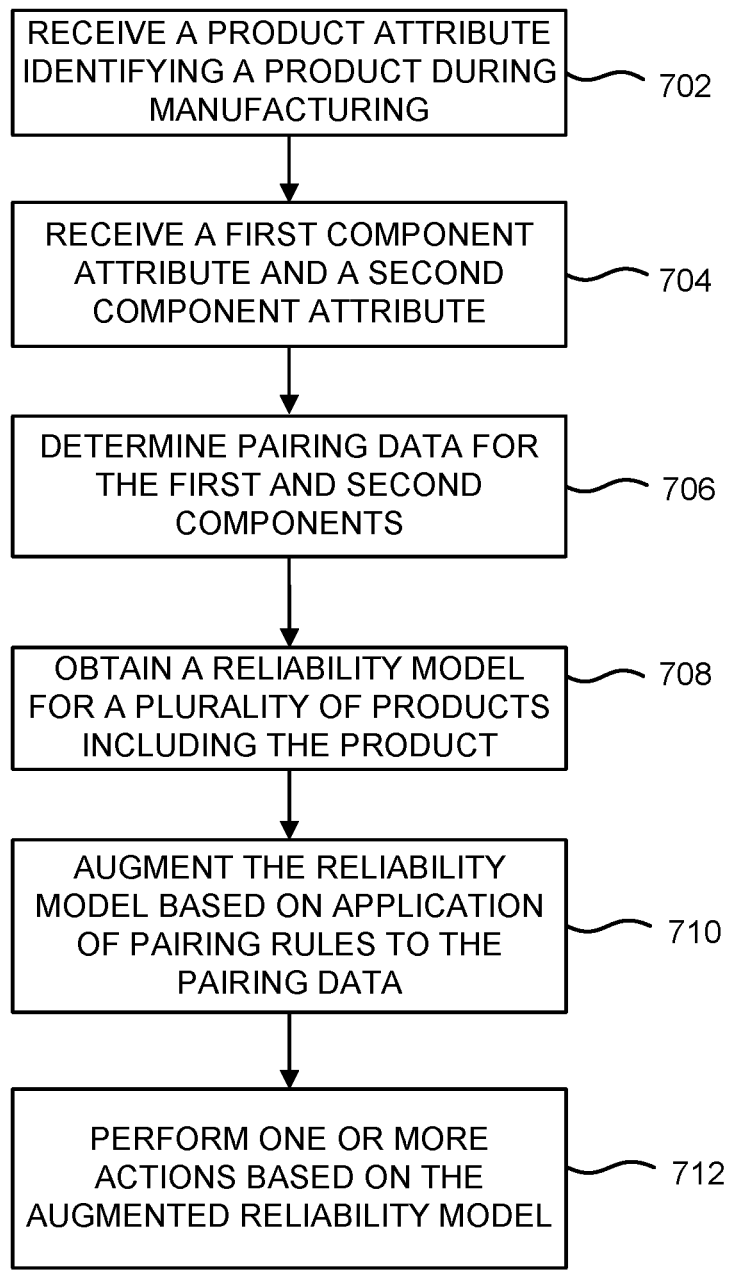
FIG. 7 is a plan view illustration of a flow chart for a method of augmenting a reliability model for a product during manufacturing, according to embodiments of the present invention.

FIG. 7 is a flow chart illustrating a block diagram of a method of augmenting a reliability model for a product during manufacturing according to some embodiments of the present disclosure. At block 702, a product attribute identifying a product during its manufacture is received. For instance, traceability module 312 of model augmenting system 204 may receive product attribute 308 from test tool operating system 304, as discussed herein with respect to FIG. 3. The product attribute may be a serial number, model number, lot number, die coordinates of a wafer, and the like, that is assigned to a product under test, e.g., product 306 in FIG. 3, during manufacturing.

At block 704, a first component attribute and a second component attribute may be received. The first and second component attributes may identify two components assembled on the product. As an example, compatibility module 318 of model augmenting system 204 may receive the first and second components attributes (e.g., component attributes 316) from traceability module 312, as discussed herein with respect to FIG. 3. Similar to product attributes, component attributes may be any form of identification of the two or more components.

Thereafter, at block 706, pairing data for the first and second components may be determined. Determining the pairing data can be performed by first receiving manufacturing data for the first and second components. Manufacturing data be any data acquired during manufacturing of the component, as already discussed in detail herein under the section entitled "Manufacturing Data" with respect to FIG. 3. In embodiments, compatibility module 318 may receive the manufacturing data from a manufacturing information database, e.g., manufacturing information database 320, as discussed herein with respect to FIG. 3. Once the manufacturing data is received, a set of compatibility rules may be applied to the manufacturing data for the first and second components. In embodiments, the set of compatibility rules may be established by a compatibility model implemented in a compatibility module. For instance, a set of compatibility rules may be contained within compatibility model 319 of compatibility module 318, as discussed herein with respect to FIG. 3. The set of compatibility rules may be used to determine a quality metric of a pairing of two or more components, as discussed herein with respect to FIGS. 5A-5D. Thereafter, pairing data may be determined from the application of the compatibility rules to the first and send manufacturing data. The pairing data may be determined by a compatibility module, e.g., compatibility module 318 in FIG. 3, upon application of the compatibility rules contained in compatibility model 319. In embodiments, the pairing data may be a quality metric representing a measure of quality of pairing between components in a product. Pairing data may be a simple Boolean value indicating whether the pairing is a neutral pairing, a positive pairing, a negative pairing, or an unseen pairing. In some embodiments, pairing data may be a value representing a quality metric across a broad spectrum ranging between positive and negative quality metrics.

Thereafter, at block 708, a reliability model can be obtained for a plurality of products including the product. For example, a general reliability model representing the general population of products similar to the product can be obtained. In some embodiments, the general reliability model is determined by a manufacturer of the general body of products.

Then, at block 710, the reliability model can be augmented based on the application of a set of pairing rules to the pairing data. The set of pairing rules may be contained within a pairing module, e.g., pairing module 324 in FIG. 3. The set of pairing rules may be used to determine one or more actions to be performed based on the augmented reliability mode at block 712. For example, the one or more actions may be to generate a custom maintenance plan for the product based on the pairing data. The custom maintenance plan can compensate for any positive or negative metrics resulting from the pairing of the first and second components. In another example, the one or more actions may be to determine a remaining useful life of the product.

Figure 8:
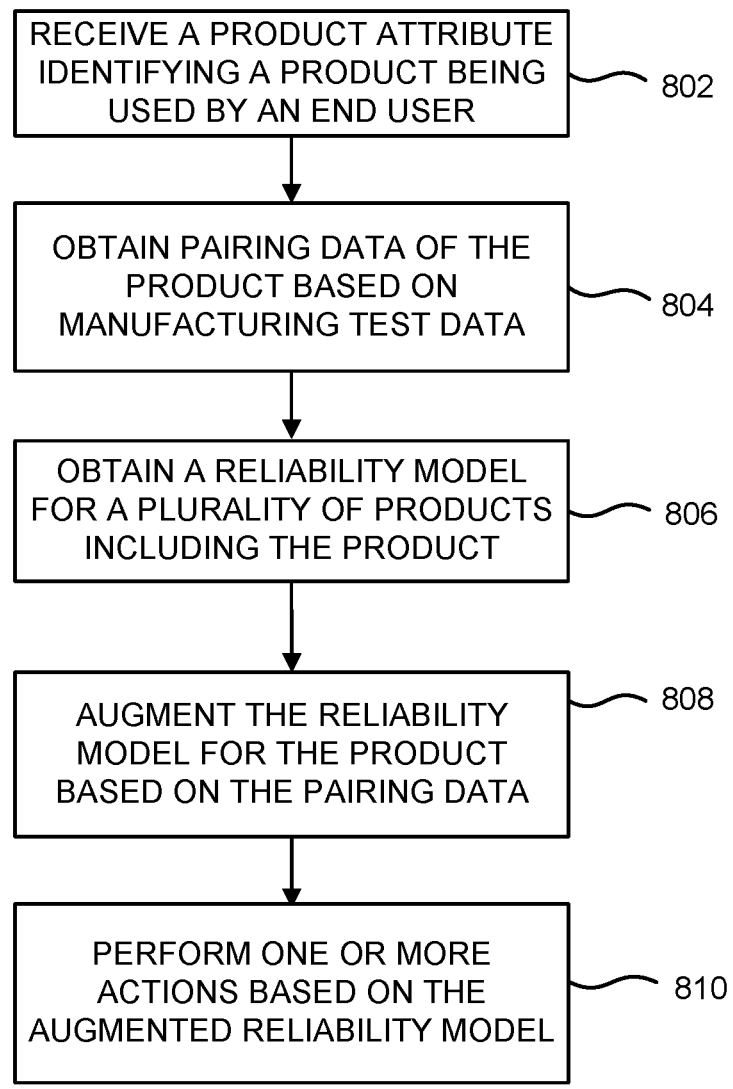
FIG. 8 is a plan view illustration of a flow chart for a method of augmenting a reliability model for a product being used by an end user, according to embodiments of the present invention.

FIG. 8 is a flow chart illustrating a block diagram of a method of augmenting a reliability model for a product being used by an end user according to some embodiments of the present disclosure. At block 802, a product attribute identifying a product during being used by an end user is received. For instance, product 336 in FIG. 3 can send product attributes 308 to reliability module 334 that identifies product 336. As mentioned herein, the product attributes may be a serial number, model number, lot number, die coordinates of a wafer, and the like, that is assigned to the product being used for identification purposes.

At block 804, pairing data of the product in use can be obtained. As mentioned herein with respect to FIG. 3, the pairing data can indicate a quality of pairing between two components in the product. For instance, the pairing data can indicate a positive or a negative pairing metric when two components of the product being used are paired together.

Then at block 806, a reliability model for a plurality of products including the product can be obtained. For instance, a reliability model for a population of products including the product can be received by a reliability module from a manufacturing information database. The reliability model may be for the general population, but not specifically for the product in use.

Then, at block 808, the reliability model can be augmented based on the application of a set of pairing rules to pairing data. The set of pairing rules may be contained within a pairing module, e.g., pairing module 324 in FIG. 3. The set of pairing rules may be used to determine one or more actions to be performed based on the augmented reliability mode at block 810. For example, the one or more actions may be to generate a custom maintenance plan for the product being used based on the pairing data. The custom maintenance plan can compensate for any positive or negative metrics resulting from the pairing of two or more components in the product being used. In another example, the one or more actions may be to determine a remaining useful life of the product being used.

V. Example Device

Figure 9:
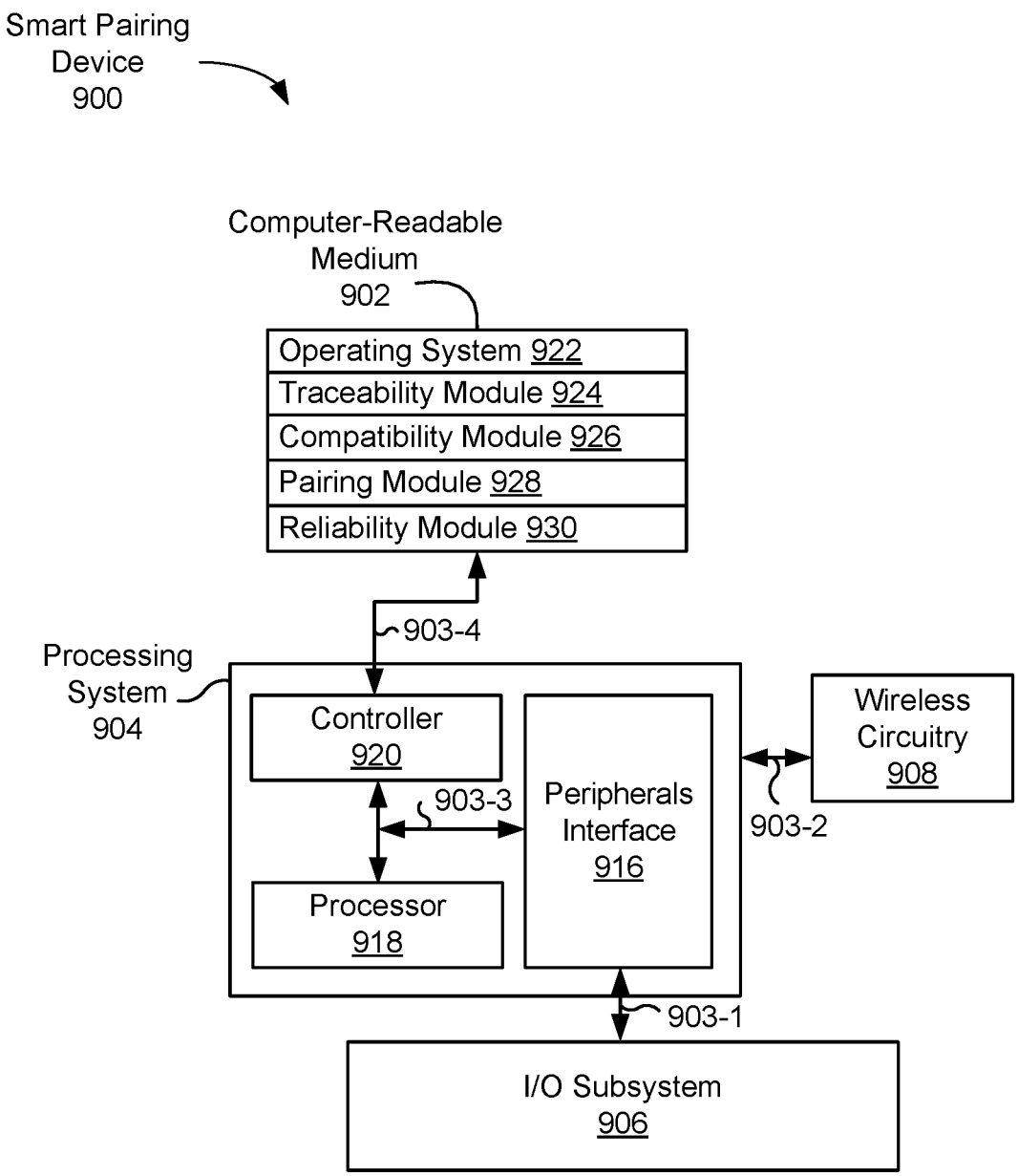
FIG. 9 is a plan view of a block diagram of an exemplary device, according to an embodiment of the present invention.

FIG. 9 is a block diagram of an example device 900, according to embodiments of the present invention. Device 900 generally includes computer-readable medium 902, a processing system 904, an Input/Output (I/O) subsystem 906, and wireless circuitry 908. These components may be coupled by one or more communication buses or signal lines 903. Device 900 can be any electronic device, including a handheld computer, a tablet computer, server computer, laptop computer, tablet device, tester tool, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' (e.g., a test tool operating system) conventional circuitry such as an antenna system, an RF transceiver, one or more amplifiers, a tuner, one or more oscillators, a digital signal processor, a CODEC chipset, memory, etc.

Wireless circuitry 908 may be coupled to a processing system 904 through peripherals interface 916. Interface 916 can include conventional components for establishing and maintaining communication between peripherals and processing system 904. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

One or more processors 918 run various software components stored in medium 902 to perform various functions for device 900. In some embodiments, the software components include an operating system 922, a traceability module 924, a compatibility module 926, a pairing module 928, and a reliability module 930, each of which are discussed in detail herein for performing methods of augmenting a reliability model.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Traceability module 924 may be lines of code stored in medium 902 configured to determine an identity of a product under test. Traceability module 924 may access a genealogy database to determine the identity of the product under test, as well as the identity of two or more components assembled on the product under test, as discussed herein with respect to FIG. 3.

Compatibility module 926 may be lines of code stored in medium 902 configured to determine manufacturing data of the two or more products assembled on the product under test. Compatibility module 926 may receive the identity of the two or more components and query a manufacturing information database to receive manufacturing data of the two or more components. A quality metric of the pairing of the manufacturing data may then be determined according to a set of compatibility rules from a compatibility model. The quality metric may be outputted as pairing data, as discussed herein with respect to FIG. 3.

Pairing module 928 may be lines of code stored in medium 902 configured to determine one or more actions to be performed based on the pairing data from compatibility module 926. The pairing data may be applied to a set of pairing rules by a pairing module to determine the one or more actions to be performed, as discussed herein with respect to FIG. 3.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. In some embodiments, I/O subsystem 906 can include a display and user input devices such as a keyboard, mouse, and/or track pad.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A method of augmenting a reliability model for a manufactured product, the method comprising:
receiving a product attribute identifying a product under test, the product under test having been assembled from two or more components, wherein the two or more components include a first component that is installed on the product under test and a second component that is installed on the product under test;
receiving a first component attribute and a second component attribute, the first component attribute identifying the first component and the second component attribute identifying the second component;
receiving first manufacturing data comprising manufacturing data associated with the first component, wherein the first manufacturing data includes data generated during manufacturing of the first component;
receiving second manufacturing data comprising manufacturing data associated with the second component, wherein the second manufacturing data includes data generated during manufacturing of the second component;

comparing the first manufacturing data to the second manufacturing data;
identifying a measure of compatibility between the first component and the second component based on the comparison between the first manufacturing data and the second manufacturing data;
determining pairing data based at least in part on a relationship between a performance of a particular finished product and the measure of compatibility between the first component and the second component, wherein the measure of compatibility represents an effect of pairing the first component with the second component on an expected performance of the particular finished product, and wherein the particular finished product is the product under test or the particular finished product includes the product under test;
retrieving, from a database, the reliability model for a general population of finished products that includes the particular finished product;
storing the reliability model in memory; and
modifying the reliability model stored in memory based on an application of a set of pairing rules to the pairing data to generate an augmented reliability model for use in performing one or more actions to reduce a probability of failure of the product under test under operating conditions.

2. The method of claim 1, wherein a type of the first manufacturing data and a type of the second manufacturing data is defined by a compatibility model, wherein the compatibility model includes a set of compatibility rules that is configured to determine the pairing data from the set of compatibility rules.

3. The method of claim 1, further comprising analyzing a multi-dimensional model to reduce a dimensionality of the data when the product under test includes more than the first component and the second component, or when at least one of the first component and the second component of the product under test includes more than one type of manufacturing data.

4. The method of claim 1, wherein the pairing data indicates that the pairing of the first component and the second component is an unseen pairing.

5. The method of claim 1, wherein performing one or more actions with the augmented reliability model includes augmenting a maintenance plan for the particular finished product.

6. The method of claim 1, wherein performing one or more actions with the augmented reliability model includes determining a remaining useful lifetime of the particular finished product based on the augmented reliability model.

7. The method of claim 1, wherein performing one or more actions with the augmented reliability model includes customizing a data collection method for the particular finished product.

8. The method of claim 1, wherein the augmented reliability model is a modified reliability model for the particular finished product.

9. The method of claim 1, wherein obtaining the reliability model comprises querying a manufacturing information database and receiving the reliability model.

10. The method of claim 1, wherein the particular finished product is in use by an end user.

11. The method of claim 1, wherein the first and second component attributes and the first and second manufacturing data are received by a compatibility module containing a compatibility model.

12. A computer product comprising a non-transitory computer readable medium storing a plurality of instructions that when executed control a device including one or more processors, the instructions comprising:
receiving a product attribute identifying a product under test, the product under test having been assembled from two or more components, wherein the two or more components include a first component that is installed on the product under test and a second component that is installed on the product under test;
receiving a first component attribute and a second component attribute, the first component attribute identifying the first component and the second component attribute identifying the second component;
receiving first manufacturing data comprising manufacturing data associated with the first component, wherein the first manufacturing data includes data generated during manufacturing of the first component;
receiving second manufacturing data comprising manufacturing data associated with the second component, wherein the second manufacturing data includes data generated during manufacturing of the second component;
comparing the first manufacturing data to the second manufacturing data;
identifying a measure of compatibility between the first component and the second component based on the comparison between the first manufacturing data and the second manufacturing data;
determining pairing data based at least in part on a relationship between a performance of a particular finished product and the measure of compatibility between the first component and the second component, wherein the measure of compatibility represents an effect of pairing the first component with the second component on an expected performance of the particular finished product, and wherein the particular finished product is the product under test or the particular finished product includes the product under test;
retrieving, from a database, a reliability model for a general population of finished products that includes the particular finished product;
storing the reliability model in memory; and
modifying the reliability model stored in memory based on an application of a set of pairing rules to the pairing data to generate an augmented reliability model for use in performing one or more actions to reduce a probability of failure of the product under test.

13. A device comprising:
memory configured to store lines of code; and
one or more processors coupled to the memory, the one or more processors configured to:
receive a product attribute identifying a product under test, the product under test having been assembled from two or more components, wherein the two or more components include a first component that is installed on the product under test and a second component that is installed on the product under test;
receive a first component attribute and a second component attribute, the first component attribute identifying the first component and the second component attribute identifying the second component;
receive first manufacturing data comprises manufacturing data associated with the first component, wherein the first manufacturing data includes data generated during manufacturing of the first component;

receive second manufacturing data comprises manufacturing data associated with the second component, wherein the second manufacturing data includes data generated during manufacturing of the second component;
compare the first manufacturing data to the second manufacturing data;
identify a measure of compatibility between the first component and the second component based on the comparison between the first manufacturing data and the second manufacturing data;
determine pairing data based at least in part on a relationship between a performance of a particular finished product and the measure of compatibility between the first component and the second component, wherein the measure of compatibility represents an effect of pairing the first component with the second component on an expected performance of the particular finished product, wherein the particular finished product is the product under test or the particular finished product includes the product under test;
retrieve, from a database, a reliability model for a general population of finished products that includes the particular finished product;
store the reliability model in memory; and
modify the reliability model stored in memory based on an application of a set of pairing rules to the pairing data to generate an augmented reliability model for use in performing one or more actions to reduce a probability of failure of the product under test.

14. The device of claim 13, wherein the memory includes a traceability module, compatibility module, and a pairing module.

* * * * *